United States Patent [19]
Ide et al.

[11] Patent Number: 5,418,770
[45] Date of Patent: May 23, 1995

[54] METHOD OF AND APPARATUS FOR CORRECTING EDGE INTERVAL OF PIT IN OPTICAL RECORDING/READ-OUT APPARATUS

[75] Inventors: Hiroshi Ide, Kodaira; Takeshi Maeda, Kokubunji; Atsushi Saito, Ichikawa, all of Japan

[73] Assignee: Hitachi, Ltd., Tokyo, Japan

[21] Appl. No.: 764,922

[22] Filed: Sep. 24, 1991

Related U.S. Application Data

[63] Continuation-in-part of Ser. No. 720,706, Jun. 25, 1991, abandoned.

[30] Foreign Application Priority Data

Jun. 29, 1990 [JP] Japan .................................. 2-170052
Sep. 28, 1990 [JP] Japan .................................. 2-256904

[51] Int. Cl.$^6$ .............................................. G11B 7/00
[52] U.S. Cl. .................................... 369/116; 369/124
[58] Field of Search ............... 369/48, 116, 124, 100, 369/109, 49, 50, 51, 59, 121, 122, 32, 126, 47, 54, 55, 57, 58, 60, 64; 346/76 L

[56] References Cited

U.S. PATENT DOCUMENTS

| | | |
|---|---|---|
| 4,873,680 | 10/1989 | Chung et al. . |
| 4,979,162 | 12/1990 | Kimoto et al. ............ 369/116 |
| 5,043,971 | 8/1991 | Van et al. ............ 369/116 |
| 5,070,495 | 12/1991 | Bletscher, Jr. et al. ............ 369/116 |
| 5,072,435 | 12/1991 | Balcx ............ 369/116 |

FOREIGN PATENT DOCUMENTS

| | | |
|---|---|---|
| 126682 | 11/1984 | European Pat. Off. . |
| 289004 | 11/1988 | European Pat. Off. . |
| 388271 | 9/1990 | European Pat. Off. . |
| 59140647 | 8/1984 | Japan . |
| 61-74178 | 4/1986 | Japan . |
| 61122932 | 6/1986 | Japan . |
| 61-239441 | 10/1986 | Japan . |
| 63-48617 | 3/1988 | Japan . |
| 61304427 | 12/1988 | Japan . |
| 1102739 | 4/1989 | Japan . |

OTHER PUBLICATIONS

"Application of Pit Edge Recording on PbTeSe Thin Films", Digest of National Conference on 70th Anniversary of Foundation of the IECE of Japan, pp. 4–176.

Primary Examiner—Tommy P. Chin
Assistant Examiner—Thai Tran
Attorney, Agent, or Firm—Fay, Sharpe, Beall, Fagan, Minnich & McKee

[57] ABSTRACT

A pit edge interval correcting method in an optical recording/read-out apparatus wherein as data items to be used to correct pit edge intervals for cancellation of a thermal interference from a previously recorded pattern, there is formed a table representing relationships between kinds of record patterns and edge shift quantities of the patterns in a read-out signal. Edge shift quantities of particular patterns with respect to a unitary variation quantity of a recording medium surface temperature (an ambient temperature of an optical disk) and edge shift quantities of particular patterns with respect to a unitary variation quantity of laser power are beforehand acquired as correction control data. Before actual data are recorded, the particular patterns are again recorded on a medium and read out therefrom. If an edge shift occurs in a read-out signal, a variation quantity of the recording medium surface temperature and a variation quantity of the laser power are separately obtained based on a quantity of the edge shift occurring and the correction control data collected in advance. Using each variation quantity, the value set to the laser power is altered and/or the data in the table are updated to correct the actual data.

16 Claims, 18 Drawing Sheets

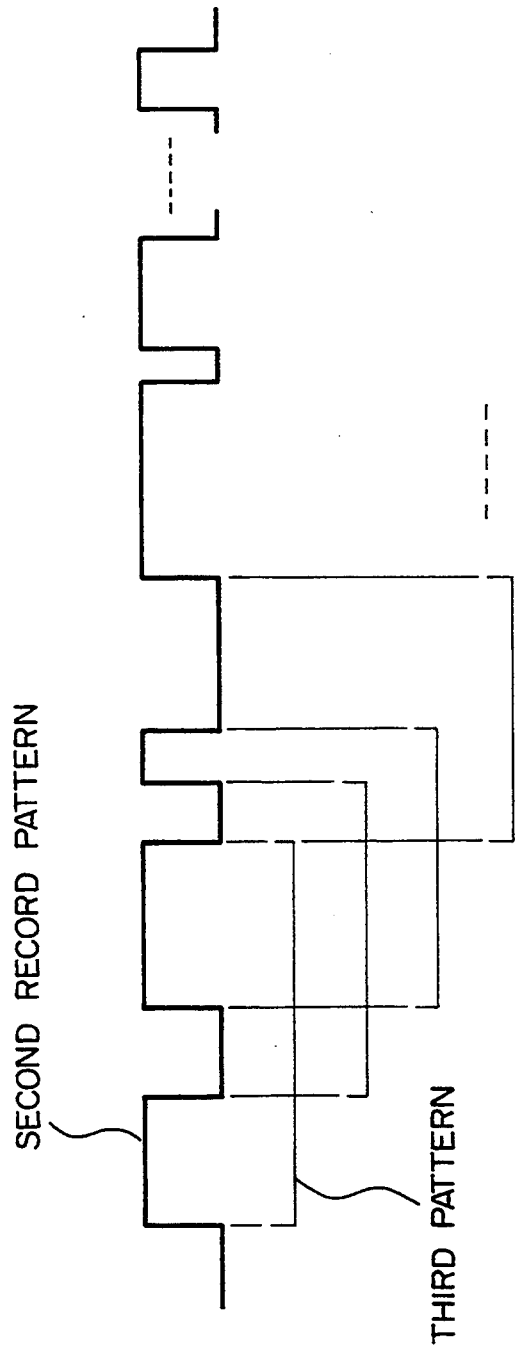

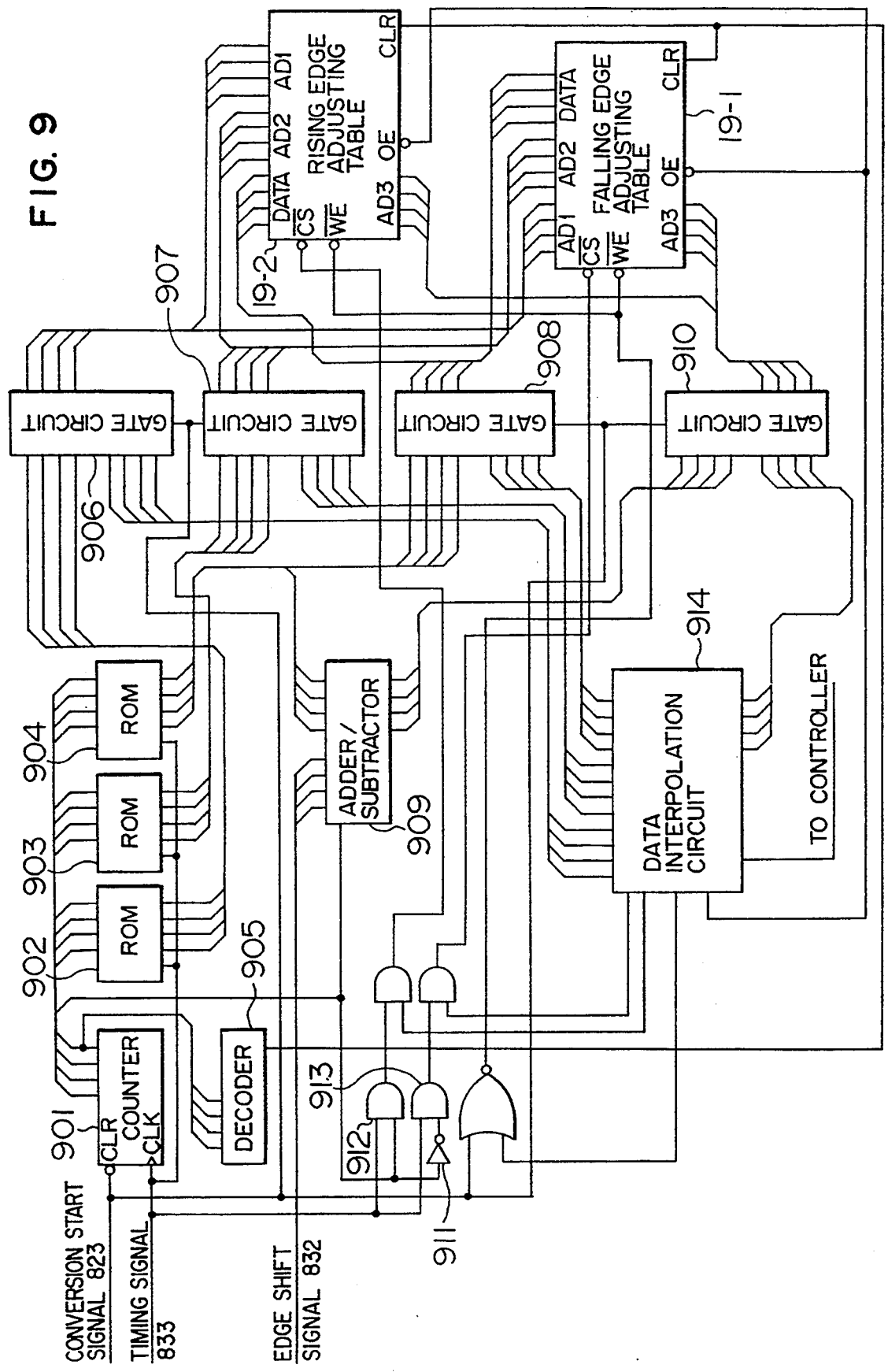

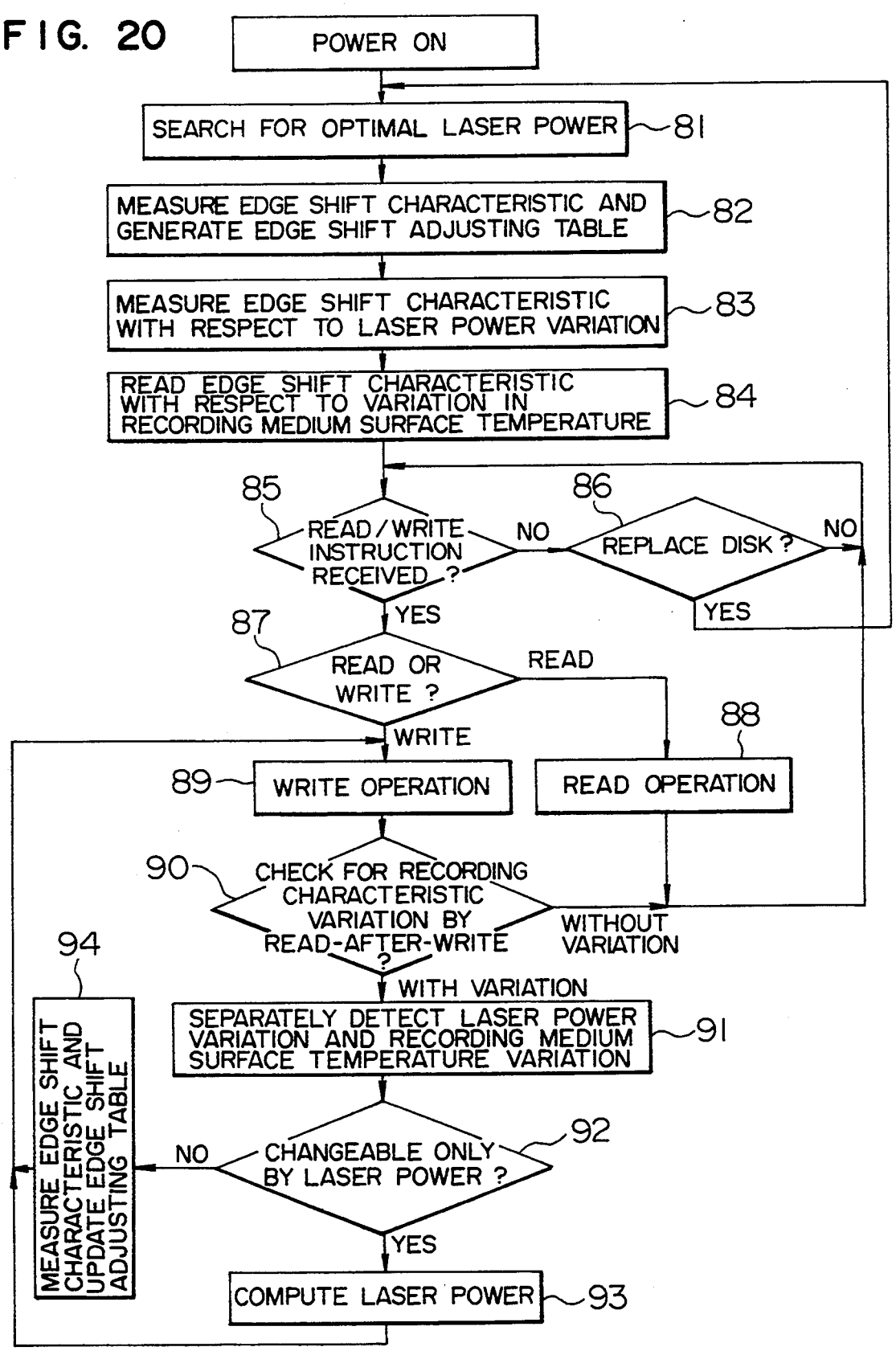

METHOD OF AND APPARATUS FOR CORRECTING EDGE INTERVAL OF PIT IN OPTICAL RECORDING/READ-OUT APPARATUS

CROSS-REFERENCE TO RELATED APPLICATION

This application is a continuation-in-Part of application Ser. No. 720,706, filed Jun. 25, 1991, now abandoned.

BACKGROUND OF THE INVENTION

The present invention relates to a method of and an apparatus for correcting an edge interval of record signals in an optical recording/read-out apparatus in which digital signals are recorded on a recording medium such as an optical disk and the recorded signals are read out therefrom, wherein an edge interval is corrected for record signals written in the recording medium based on a power of the record signals and a record pattern written thereon immediately therebefore.

As a recording medium on which digital or digitized signals are written, there has been used an optical disk. In the recording operation, a laser beam is focused onto a recording surface of the optical disk such that the intensity of the focused light is varied in relation to information to be stored thereon.

In this connection, there has been used a pit edge recording method in which the laser power is modified for a recording operation on the disk so as to store information before and after the record mark, and hence two or more data items are recorded for a record mark, which efficiently develops a high-density recording operation.

According to the pit edge recording method, in general, when a low-power laser is utilized in the recording operation, the contour of the record mark thus created is likely to be unstable. In addition, when the recording speed is altered, the amount of thermal energy applied to a unitary area and the thermal distribution are varied, thereby disadvantageously generating various shapes of record marks.

In consequence, actually, in order to create a stable or uniform shape of the record mark for the recording and read-out operations, according to the "Application of Pit Edge Recording on PbTbSe Thin Film" written at page 4-176 of the Digest of the National Conference on 70th Anniversary of Foundation of the IECE of Japan, the operation is accomplished, for example, by adjusting the laser pulse length as follows. Namely, the recording laser is produced with an intensity slightly higher than the usual intensity such that the laser pulse length is shortened in the recording operation to suppress the excessive portion of the mark length associated with the line speed of the laser; moreover, in the read-out operation, the pulse length is reduced in a binarized signal.

Moreover, in general, the contour of the recorded mark primarily depends on the recording sensitivity and the thermal conductivity of the recording medium, the laser beam intensity distribution of the laser beam used for the recording operation, the wavefront aberration leading to a state where the actual focal state cannot be developed even when the laser beam is focused, and the like. Consequently, when a combination of the recording apparatus and the recording medium varies, the characteristics of the recording and read-out operations are also changed. In addition, in the recording operation, the level of the laser power of the recording apparatus changes as the time lapses. Even if an autoamtic power control (APC) mechanism is disposed to automatically control the laser power, there cannot be avoided a laser power level deviation in a certain range. This factor also varies the recording and read-out characteristics, which leads to a change in the record mark length in the recording operation and to a variation in a pulse interval of read-out signals in the read-out operation.

In consequence, for the recording apparatus of which the correction value of the laser pulse length and the laser power are respectively set to fixed values before delivery thereof to the users, the design specifications are decided depending on values of recording and read-out characteristics measured by use of many combinations of various recording media and recording apparatuses. In this operation, in order to guarantee a high reliability of the detection in any situation in consideration of a range of deviation of the recording and read-out characteristics due to the various combinations above, the recording density is determined with a large margin. Namely, the decision of the specifications is conducted with a sacrifice of the recording density.

In order to overcome this difficulty, there has been proposed a method for absorbing the deviation in the characteristics due to the combinations of the recording media and the recording apparatus so as to develop a high recording density, in which a test pattern is beforehand recorded on an optical disk such that the test pattern is read out therefrom to attain information based thereon for adjustment of the recording conditions. For example, in an apparatus described in the JP-A-61-239441, the laser power of the recording operation is adjusted and fixed to one level; in a device described in the JP-A-61-74178, an adjustment amount of the recording pulse width is adjusted and fixed to one amount independent of the recording pulse width; and in an apparatus described in the JP-A-61-304427, the fixed laser power of the recording operation, the fixed adjustment value related to and independent of the recording pulse width, and the automatic equalization coefficient of the read-out operation are simultaneously adjusted.

Furthermore, the recording operation of the optical disk is fundamentally accomplished through a thermal diffusion. Consequently, owing to preceding and following series of recording pulses associated with a record mark, the thermal distribution is diffused to cause a phenomenon in which the contour of the record mark is varied (to be called a thermal interference herebelow). This phenomenon also leads to a variation in the pulse interval of the read-out signals in the read-out operation. Consequently, in order to conduct an appropriate correction in the recording operation, the influence of the thermal interference is required to be taken into consideration. To cope therewith, according to the recording method described in the JP-A-63-48617, the width of the record signal is changed depending on an edge interval of the preceding record signal. This method, however, is attended with the following problem.

Namely, when it is desired to increase the recording density up to a level where the record mark contour and the interval between record marks are of a size similar to the size of a laser spot focused onto a surface of the recording film, the range where the influence of the thermal interference of the optical disk is exerted exceeds the minimum length of the record mark used. In other words, a series of laser pulses adopted for the previous recording operation exercise influence on the shift of the edge position of a record mark to be next recorded on the disk. Particularly, in a case of a recording medium which has a high recording sensitivity with respect to an intensity of a laser beam and on which the recording operation can be hence accomplished with a low laser power, a high thermal conductivity is developed in general and the thermal interference related thereto exerts influence thereon in a large range.

Moreover, in the adjustment method conducted in association with the edge interval of a record signal, since information related to the adjustment amount is preset in advance, the adjustment amount cannot be modified depending on a variation in the recording characteristic taking place in the course of the recording and the reading operation. In consequence, an adjusting error appears in relation to the discrepancy between the preset recording characteristic and the changed recording characteristic, which disadvantageously leads to an inappropriate adjustment.

On the other hand, in the method of attaining recording condition adjusting information as described in the three articles above, each of the recording laser power and the recording pulse width has an adjustment quantity of a single value. Consequently, it is impossible to minimize the variation of the recording mark length due to the thermal interference of which the magnitude varies depending on various record patterns.

Heretofore, since the signal read-out of the reproducing system has a narrow frequency bandwidth, a pulse signal reproduced has had an expanding skirt or base portion. In this situation, in order to reduce the linear interference occurring between neighborhood signals due to a superimposed portion thereof, a linear equalizer such as a transversal filter is used on the reproduction side in general in the fields of communications, magnetic recording, etc.

However, the influence of the thermal diffusion appears in the read-out operation primarily in the form of a shift of the waveform along a direction of time. This is associated with a nonlinear interference component of an interference between codes, which cannot be simply expressed by use of a linear superimposition of fundamental waveforms related to the record information. In consequence, the component of the edge position variation due to the thermal interference occurring in the recording operation cannot be handled by the linear equalizer. Namely, actually, it is quite difficult for the system on the read-out side to appropriately treat the interference component in a real-time manner.

Particularly, in a pit edge recording method achieving an opto-magnetic recording operation on a recording medium having a high thermal conductivity, the mark length is associated with a large shift component and hence it is required to take a large margin for the component. This necessitates the sacrifice of the recording density; i.e., the higher recording density cannot be implemented.

SUMMARY OF THE INVENTION

It is therefore an object of the present invention to provide a method of and an apparatus for correcting an edge interval of record signals in an optical recording/read-out apparatus wherein in a pit edge recording method, laser power and pulse edge position are controlled to reduce the mark length variation due to influence of the thermal interference, thereby increasing the recording density, the signal transfer speed, and the recording and read-out reliability.

In the present invention, variations of the laser power and of the recording medium surface temperature (ambient temperature of an optical disk) are separately detected from an edge shift quantity of the recorded pit. The laser power and correction value of the pit edge position are corrected on the basis of the separately detected variations.

In order to achieve the object above, the edge interval of record signals are corrected by the following method.

When data are recorded on an optical disk, there are beforehand predicted various patterns which are considered to appear in the data recording operation later and which have n edge widths (n is an integer). A sequence of record patterns including various patterns as above are recorded on the disk prior to the actual recording operation so as to determine a shift amount of an edge position of a read-out signal thereof with respect to an inherent record position thereof. Based on the result, there is produced a table containing relationships between each of the patterns and an edge shift amount associated therewith.

In an actual data recording operation, a record signal of data is collated with the patterns associated with the n edge widths stored in the table for each pattern, thereby correcting the edge width.

The correction method will next be described in more detail.

(a) A first record pattern having a predetermined duty ratio is recorded on an optical disk with a preset laser power. The recorded pattern is then read out therefrom so as to compare the read-out signal with the record signal to obtain and to determine a pulse length difference between the corresponding pulses.

(b) When the check result indicates that the difference is beyond an allowable range, the laser power is varied in a stepwise manner to record the first record pattern so as to check again the pulse length difference between the read-out signal and the record signal.

(c) Based on the result of the check, there is determined a laser power associated with the record signal of which the pulse length difference is found to be within the allowance, thereby determining the laser power to be used in a data recording operation.

(d) With the laser power thus obtained, a second record pattern including a combination of a pulse and a gap respectively having various kinds of lengths is recorded N times (N is an integer).

(e) In the read-out signal of the second record pattern, the second record pattern is further classified into a third pattern comprising n consecutive pulses and gaps (n is an integer). For each of the third patterns, an ideal edge position associated with the record signal is compared with an edge position thereof to obtain a shift amount of the last edge of the third pattern.

(f) Relationships between the third patterns and the shift quantity of the last edge of each thereof are loaded in a table, which is then stored in a memory.

(g) For a signal pattern which comprises n consecutive pulses and gaps and which has not been recognized as a third pattern, a relationship between the pattern and the shift amount of the last edge thereof is obtained through an interpolation with a measured value attained from the third pattern, and is then additionally loaded in the table.

(h) In an actual data recording operation, a record signal associated with the data is collated with patterns in the table in units of n patterns so as to determine a pattern matching with the record signal. For the obtained pattern, the last edge thereof is corrected depending on the data stored in the table.

FIG. 1 shows an example of the variation of a record mark due to a thermal interference.

In this diagram, letters $f_i$ and $e_i$ stand for edge variations, respectively. When creating the table above, assuming that the third pattern comprises three pulses and a gap, the relationships are attained such that an edge shift quantity $e_i$ is produced for patterns $l_{i-1}$, $b_{i-1}$, and $l_i$; an edge shift quantity $f_{i+1}$ is created for patterns $b_{i-1}$, $l_i$, and $b_i$; and so on, thereby storing the attained results in the memory.

Subsequently, in order to attain a relationship between a variation in the recording medium surface temperature and a quantity of the record pit edge shift related to the variation, measurements are conducted to determine shift quantities of last edges of two different predetermined patterns 1 and 2, respectively. Although the data may be obtained by changing the temperature in the apparatus with an optical disk installed therein during the measurements, it is rather favorable to write the data on the optical disk in the optical disk manufacturing process such that when the optial disk is set to the apparatus, the data are read therefrom. In addition, to attain a relationship between a variation in the laser power and a quantity of the record pit edge shift associated with the variation, measurements are conducted to detect shift quantities of last edges of the two different predetermined patterns 1 and 2, respectively. These data items are stored in a memory of the controller.

When a write instruction is received to write actual data, the patterns 1 and 2 are written together with the actual data so as to check to determine whether an edge shift occurs in a read-out signal thereof. If this is the case, the causes of the edge shift, namely, the laser power variation quantity and the quantity of variation in the recording medium surface temperature, are separately detected. These variation quantities can be obtained through computations based on the edge shift quantities respectively found in the patterns 1 and 2, beforehand-collected relationships between the variation quantity in the recording medium surface temperature and the edge shift quantities of the patterns 1 and 2, and beforehand-gathered relationships between the laser power variation quantity and the edge shift quantities of the patterns 1 and 2. If the variation quantity in the recording medium surface temperature is not exceeding a predetermined value, the laser power is set again; otherwise, data in the edge width adjusting table are updated so as to write the actual data by use of the corrected values of the table.

FIG. 2 shows an outline of the edge interval correction according to the present invention.

A record signal related to data to be recorded on the optical disk is collated with patterns loaded in the table such that edge intervals $l_1$, $b_1$, $l_2$, and $l_i$ are corrected to $l_1+E_1$, $b_1-E_1+F_2$, $l_2-E_2-F_2$, and $l_i-E_i+F_i$, respectively. In this case, the edge correction quantity $E_i$ for the edge interval $l_i$ is obtained by collating patterns $l_{i-1}-E_{i-1}+F_{i-1}$, $b_{i-1}-F_i+E_{i-1}$, and $l_i+F_i$ with the contents of the table.

When pits are recorded on the optical disk based on the record signal thus corrected, the edge positions of the read-out signal are substantially equal to the associated edge positions of the record signal before the correction.

According to the present invention, in the pit edge recording method, the edges of the record mark can be more appropriately controlled to achieve a high-density recording operation; moreover, it is possible to absorb, for example, the deviation of the record mark length due to the recording characteristic difference related to the variation of the combination of the recording media and the recording apparatus and the influence of the thermal interference associated with different record patterns.

Moreover, thanks to the utilization of a plurality of recording characteristics measured through recording and read-out operations in various areas on a recording medium, the record correction can also be accomplished in an area associated with the different line speed.

In addition, when the recording characteristics are measured each time when the recording apparatus starts its operation, when a recording medium is replaced, when a predetermined period of time is elapsed, and/or in association with a change in a temperature on the recording surface or in the recording optical beam power, it is also possible to absorb the variation with a lapse of time in the characteristics on the recording apparatus side.

BRIEF DESCRIPTION OF THE DRAWINGS

FIG. 8B is a diagram of a pattern used for obtaining data for an edge width adjusting table;

FIG. 9 is a detailed diagram showing a circuit for producing an edge width adjusting table;

FIG. 20 is a flowchart showing an operation of the present invention.

DESCRIPTION OF THE PREFERRED EMBODIMENTS

Figure 1:
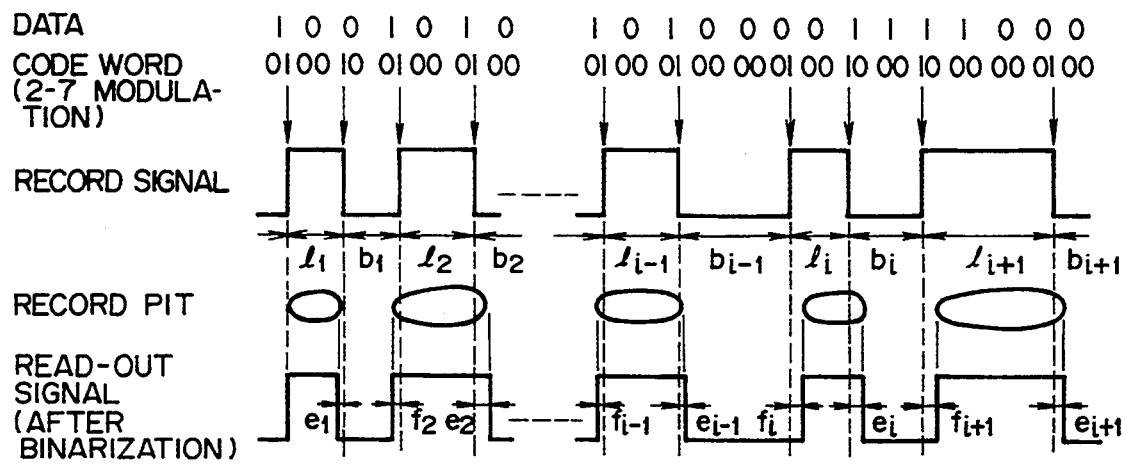
FIG. 1 is a schematic diagram showing a variation of record edges.
Figure 2:
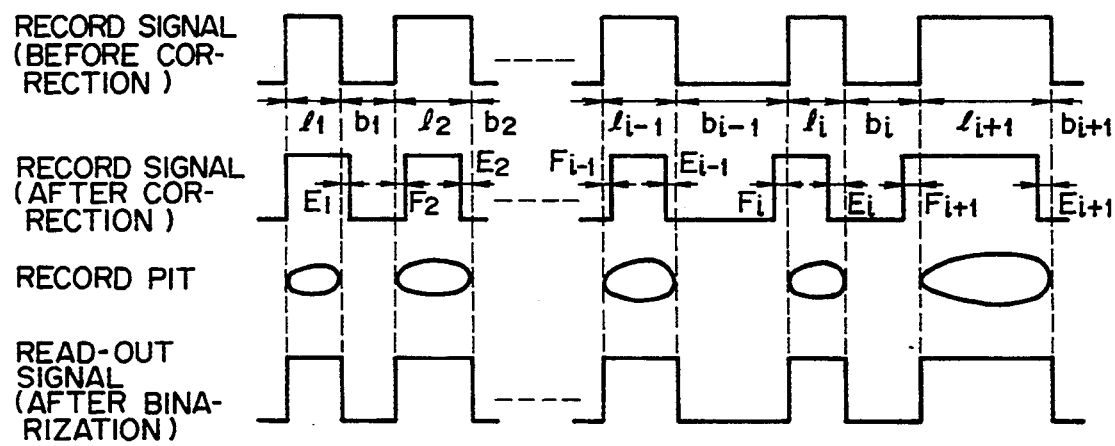
FIG. 2 is a diagram illustratively showing an outline of an edge interval correction according to the present invention.
Figure 3:
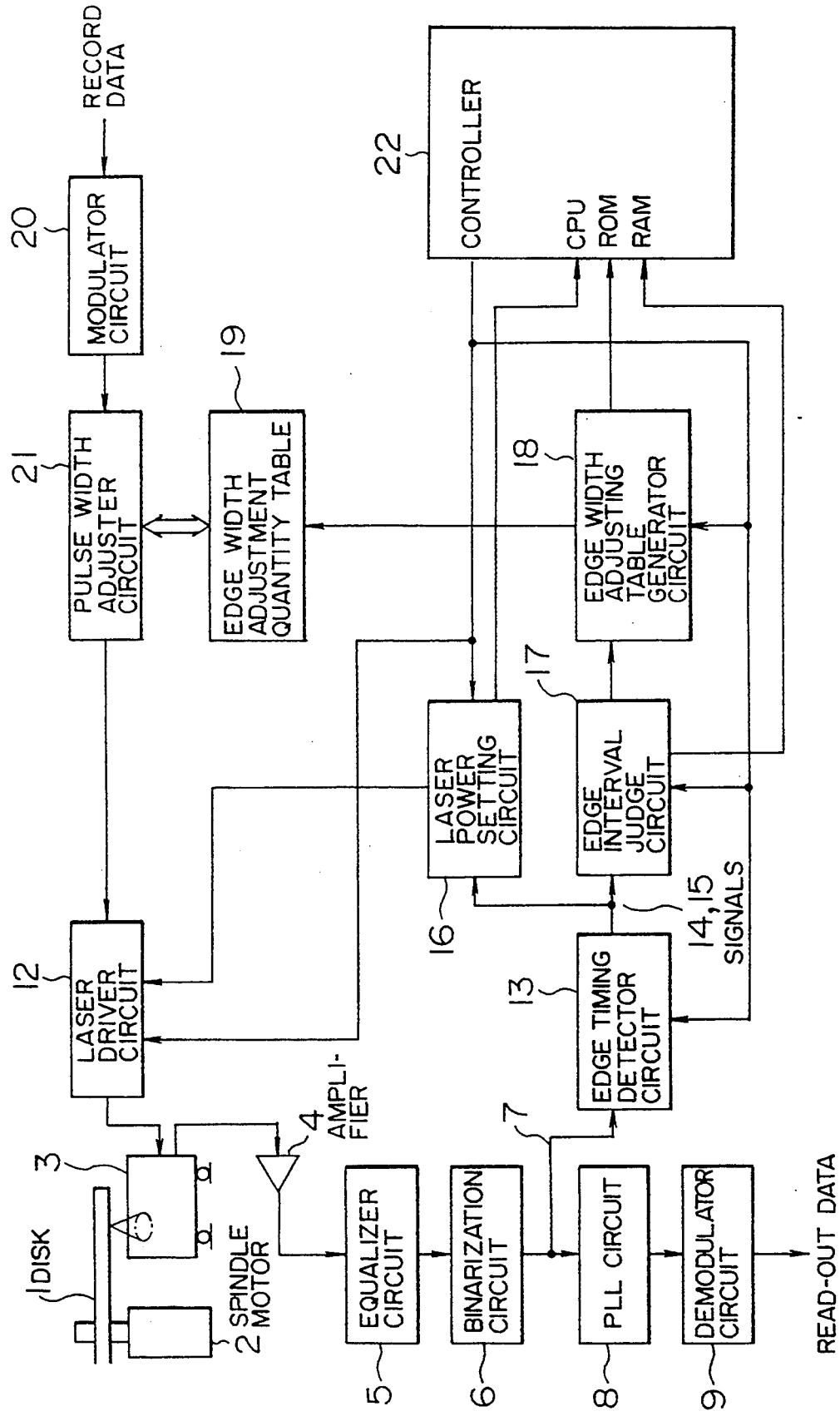
FIG. 3 is a block diagram showing an optical recording/read-out apparatus to which the present invention is applied.

FIG. 3 is a block diagram showing the constitution of an optical recording/read-out apparatus according to the present invention.

The system of FIG. 3 includes an optical disk 1, a spindle motor 2, an optical pickup 3, an amplifier 4, an equalizer circuit 5, a binarization circuit 6, a phase locked loop (PLL) circuit 8, a demodulator circuit 9, and a modulator circuit 20. The modulator circuit 20 may be of the same configuration and the same function as the associated component of the conventional optical disk device. Consequently, a redundant description thereof will be avoided.

Next, a description will be given of the operations of the blocks of FIG. 3 constituting the present invention.

An edge timing detection circuit 13 is used to detect each edge interval of a read-out signal.

An edge interval judge circuit 17 records N times (N is an integer) a predetermined record pattern comprising a combination of pulses of various kinds of lengths and gaps, and processes a read-out signal reproduced from the recorded signal. This circuit measures an edge interval for each corresponding pulse and gap, which are detected every N pulses and gaps, and obtains mean values of the edge intervals.

An edge width adjusting table generator circuit 18 creates an edge width adjustment quantity table 19 containing relationships between short patterns each consisting of a combination of n pulses and gaps (n is an integer) and quantities of deviation of edge intervals associated with the patterns. For a pattern which has not been classified as a short pattern, an interpolation is conducted by use of measured data to determine a corresponding deviation quantity of the edge interval.

An edge width adjusting circuit 21 collates a pattern in each portion of a record signal generated in association with data to be recorded with patterns stored in the edge width adjusting table 19, thereby correcting the position of each edge based on the edge interval deviation quantity loaded in the table 19.

A laser power setting circuit 16 is adopted to determine an appropriate laser power for output to a laser driver circuit 12.

The laser driver circuit 12 performs a laser power change function. Namely, this circuit 12 comprises a laser power setting circuit for an ordinary recording operation and develops a function to stepwise alter the laser power to attain optimal laser power.

The controller 22 comprises a CPU and memory devices such as ROMs and RAMs. The controller 22 controls the switching of the operation modes, the judging of processing necessary in each circuit block and the separate detection of processing of the variations of the laser power and of the recording medium surface temperature.

Next, a detailed description will be given of the constitution and the operation of the respective blocks.

Edge Timing Detection Circuit 13

Figure 4:
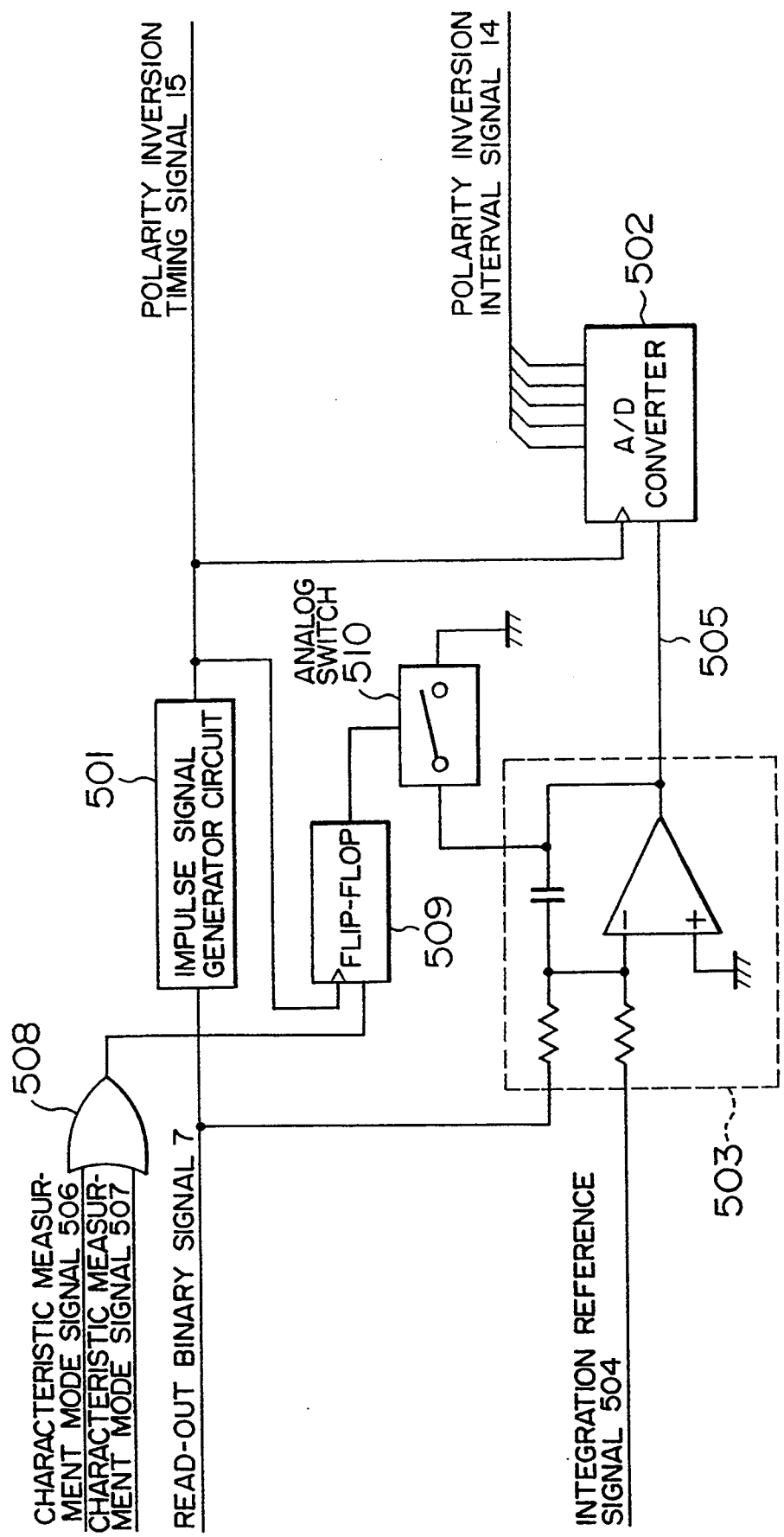
FIG. 4 is a circuit diagram showing in detail a timing detection circuit.
Figure 5:
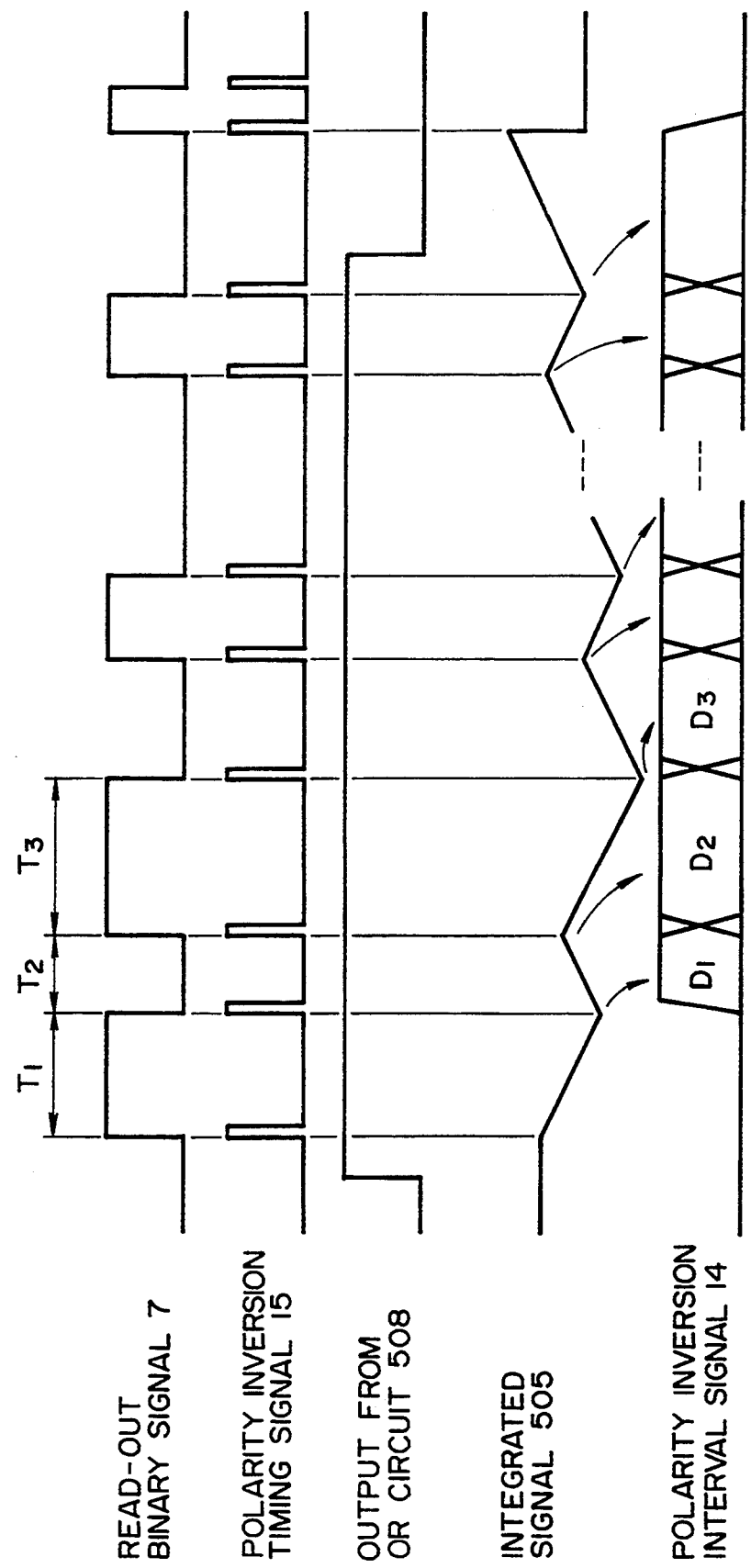
FIG. 5 is a graph showing waveforms developed in the timing detection circuit.

FIG. 4 shows the detailed circuit configuration of this circuit, whereas FIG. 5 shows waveforms of primary signals developed in this circuit.

The edge timing detection circuit 13 is disposed to process a binarized read-out signal 7 to detect a pulse length (a period of time from a rising portion of the signal to a falling portion thereof) and a gap length (a period of time from a falling portion of the signal to a rising portion thereof).

Basically, the read-out binary signal 7 is passed to an integrator circuit 503, comprising an amplifier, to be transformed into an integrated signal 505, which is then converted by an analog-to-digital (A/D) converter 502 to be a polarity inversion interval signal 14 representing a digital quantity for output to a subsequent circuit.

The integrated signal 505 represents a value associated with a quantity obtained by subtracting the total of the respective gap lengths from the total of the respective pulse lengths in a period of time from an initiation of the operation of the integrator 503 to the present point of time. Since, at each time when the polarity of the read-out binary signal 7 is inverted, a signal having an impulse-shaped waveform is inputted into the A/D converter 502 from an impulse signal generator 501, the integrated signal 505 is converted into a digital signal at the timing above. As a result, for example, D1, D2, and D3 of the interval signal 14 (FIG. 5) respectively denote digital values associated with $-T1$, $-T1+T2$, and $-T1+T2-T3$ of the binary signal 7. In this connection, the impulse waveform is also used as a polarity inversion timing signal 15 in other circuits.

Finally, an OR circuit 508, a flip-flop 509, and an analog switch 510 are used to specify an operation period of time for the integrator circuit 503.

Laser Power Setting Circuit 16

Figure 6:
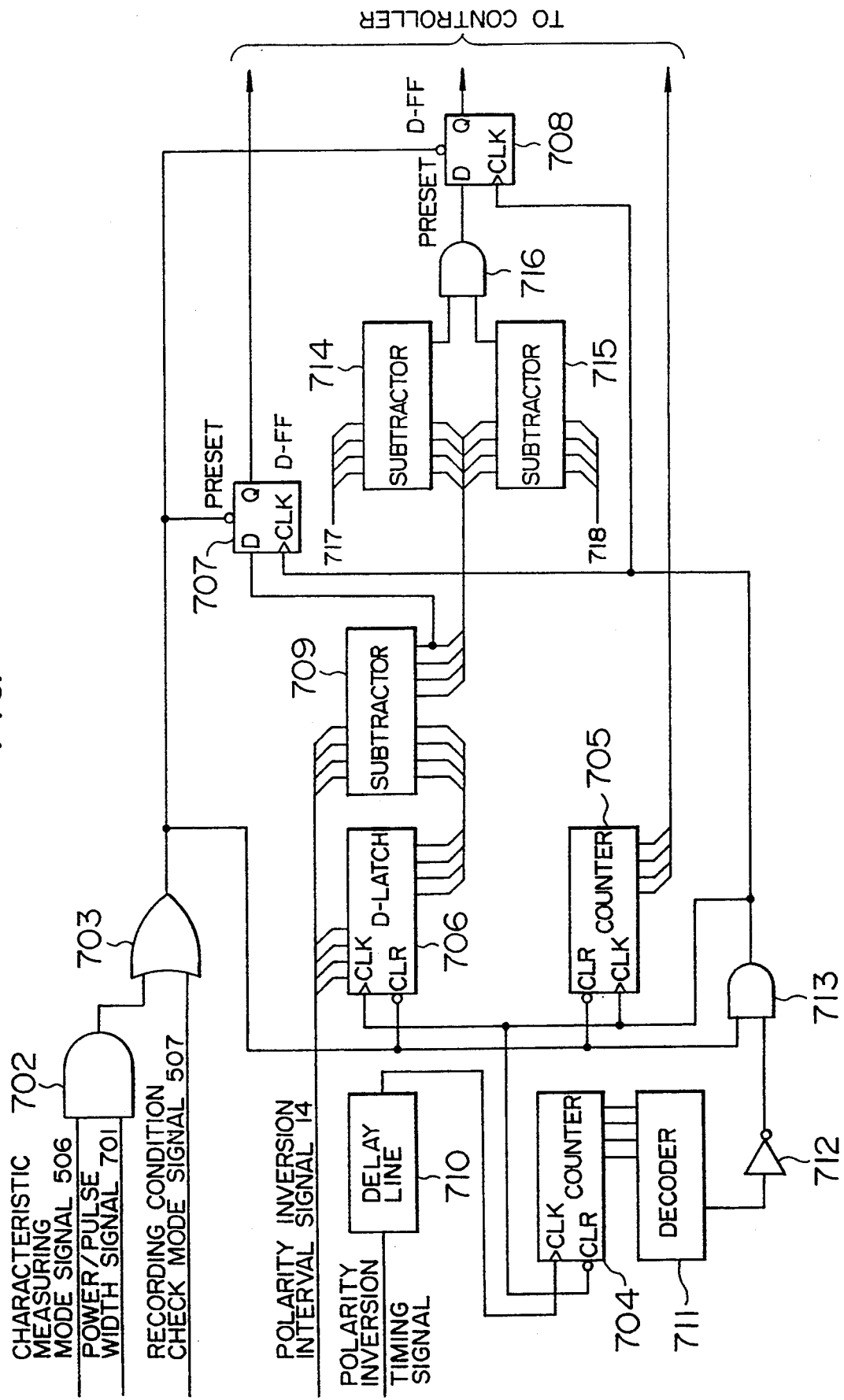
FIG. 6 is a detailed circuit diagram showing a laser power setting circuit.

FIG. 6 shows the detailed configuration of this circuit.

Figure 7:
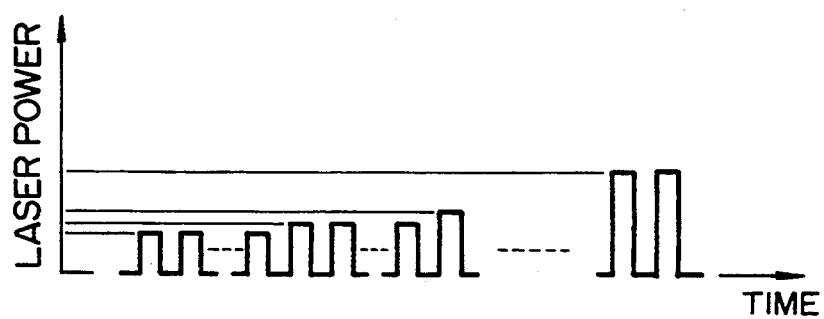
FIG. 7 is a diagram showing a test pattern for measuring a recording characteristic.

The laser power setting circuit 16 operates by using the polarity inversion interval signal 14 as a reference pulse. In the laser power check mode, the recording characteristic measuring test pattern (first record pattern) of FIG. 7 is recorded while the laser power is stepwise changed. Thereafter, the read-out signals thereof are checked to determine optimal laser power. Moreover, in the recording condition check mode, the first record pattern is recorded with a predetermined laser power such that the read-out signal thereof is then checked to decide whether or not the present laser power is within a preset allowable range.

The first record pattern is constituted with a pulse sequence having a predetermined duty ratio. When the pulse sequence is associated with a minimum available edge interval, the optimal laser power can be detected with high precision.

A latch circuit 706 and a subtractor circuit 709 are used to compute, in the laser power check mode, the duty ratio (the difference between a pulse length and a gap length) of a read-out signal of the first record pattern for each laser power level. In the recording condition check mode, the duty ratio of the read-out signal of the first record pattern is obtained for the present laser power.

An AND circuit 702 and an OR circuit 703 are employed to specify a period of time for the operation of the laser power setting circuit 16 (in the laser power and recording condition check modes).

A delay line 710, a counter circuit 704, and a decoder 711 are utilized to detect a point of time when the laser power is stepwise altered in the laser power check mode so as to produce a pulse at the point of time. A counter circuit 705 counts the pulses to indicate the strength (for which a sequential number is assigned in a strength order) of the laser power signal being used.

A flip flop 707 judges a signal representing a sign bit of the subtractor circuit 709 to determine whether or not the laser power used to record the read-out signal being processed is higher than the optimal laser power. Since the first record pattern is recorded as shown in FIG. 7 with the laser power stepwise increased, the polarity of the output signal from the flip flop circuit 707 is inverted for the first time when the optimal laser power is exceeded by the laser power used to record the read-out signal being processed. In consequence, the output from the counter circuit 705 at this point of time denotes the strength (with a sequence number in the power strength order) of the optimal laser power.

Subtractor circuits 714 and 715, an AND circuit 716, and a flip flop 708 operate in the recording condition check mode to output a signal designating whether or not the current laser power is within the preset allowable range suitable for the data recording operation.

The subtractor circuits 714 and 715 respectively have input lines 717 and 718, which are respectively applied with the upper-limit and lower-limit values of the allowable range.

Edge Interval Judge Circuit 17

Figure 8A:
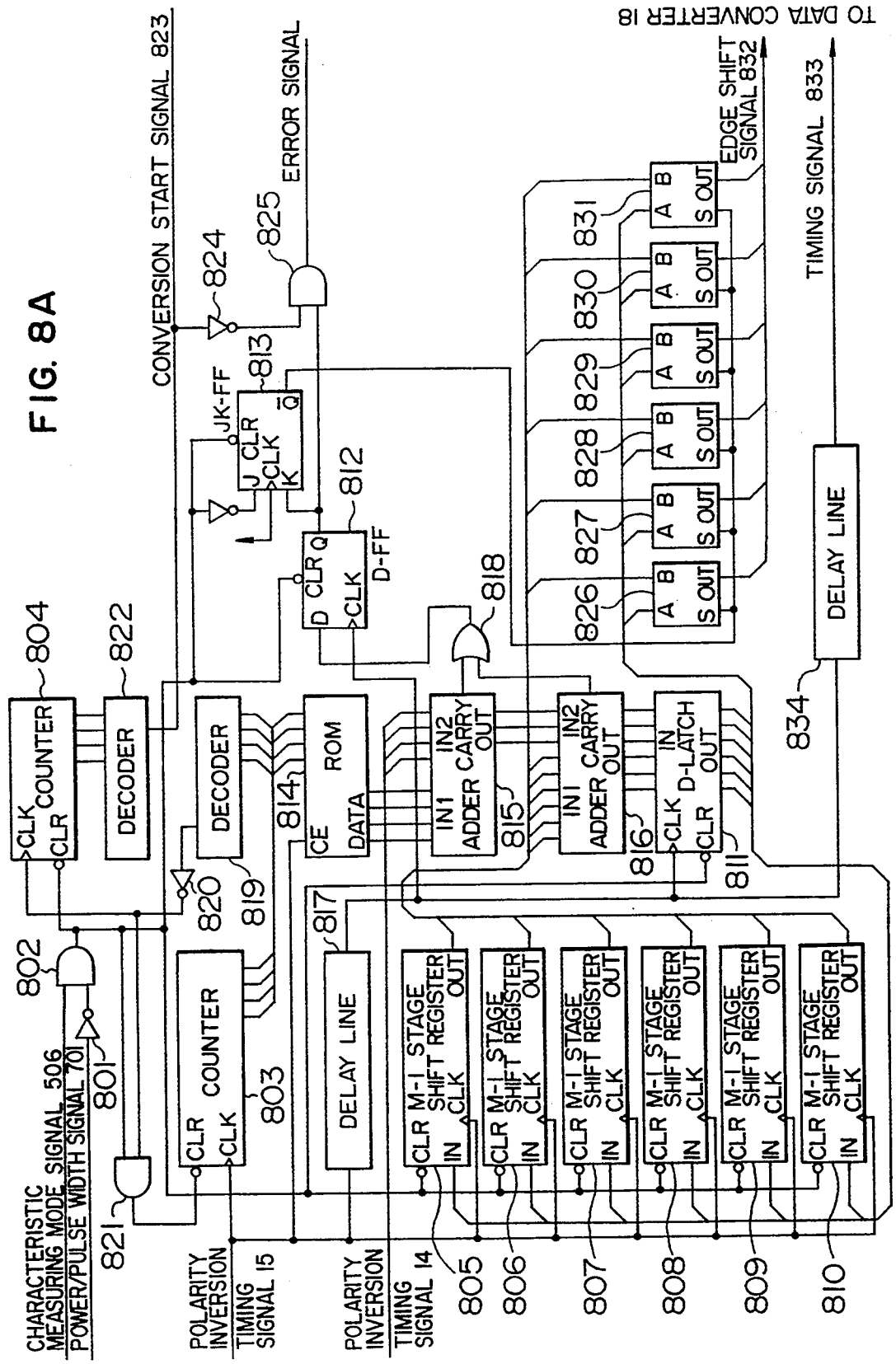
FIG. 8A is a diagram showing in detail an edge interval judge circuit.

FIG. 8A shows details of the structure of this circuit.

The edge interval judge circuit 17 achieves computations, based on a read-out signal of a predetermined second record pattern including a combination of pulses of various lengths and a gap, to obtain a shift quantity of each edge of a read-out signal related to the record signal, thereby producing data to be used to form the edge width adjusting table 19.

In this embodiment, the second record pattern is recorded N times (N is an integer) to obtain thereafter read-out signals thereof. The obtained signals are classified into third patterns each having a shorter length, the third pattern comprising three consecutive pulses and gaps. The shift quantity of the last edge portion of each of the third patterns is processed to obtain a mean shift quantity.

FIG. 8B shows the relations between the second record pattern and the third patterns.

The number of pulses of the inputted polarity inversion timing signal 15 is counted by a group of circuits including a counter circuit 803, a decoder circuit 819, a NOT circuit 820, and an AND circuit 821 to detect the sequential number (relative to the first read-out signal) assigned to the read-out signal whose edge is being processed. The count value is delivered as an address signal to a ROM circuit 814. At this moment, when the edge shift quantity is zero, there is produced a value obtained by inverting the sign of the value represented by the polarity inversion interval signal 14.

That is, assuming that the length of an i-th pulse and that of a gap of a predetermined record pattern are respectively represented as $l_i$ and $b_i$, when an address i is inputted to the ROM circuit 814 the following output signal is generated.

$$-\{(l_1-b_2)+(l_3-b_4)+ \ldots +(l_{i-1}-b_i)\}$$

(where, i is an even number)

$$-\{(l_1-b_2)+(l_3-b_4)+ \ldots +l_{i-1}\}$$

(where, i is an odd number)

The output signal and the polarity inversion interval signal 14 are supplied to the adder circuit 815, which in turn computes an edge shift quantity for the processing at the point of time.

A latch circuit 811 and shift registers 805 to 810 are used to form a ring-type data buffer together with an adder circuit 816. For each of the third patterns, the edge shift quantities (outputs from the adder circuit 815) are accumulated to be memorized as an intermediate result.

A counter circuit 804 and a decoder circuit 822 are disposed to detect the sequential number (relative to the first period) of the period or cycle of the second record pattern under processing. When the final period is detected, the polarity of a conversion initiation signal 823 is inverted, which indicates that an output signal 832 thereafter represents a mean value of the edge shift quantities for each of the third patterns.

In this regard, the flip-flop circuits 812 and 813, the NOT circuit 824, the OR circuit 818, the AND circuit 825, and the selector circuits 826 to 831 constitute a circuit unit for detecting a data error (caused by, for example, a disk defect) during the processing. In this constitution, when an error is found in the last period of the read-out signal of the second record pattern, the accumulated results of the edge shift quantities obtained for the respective third patterns up to the previous period are processed to obtain a mean value of edge shift quantities for an identical edge associated with the detected error.

Figure 10:
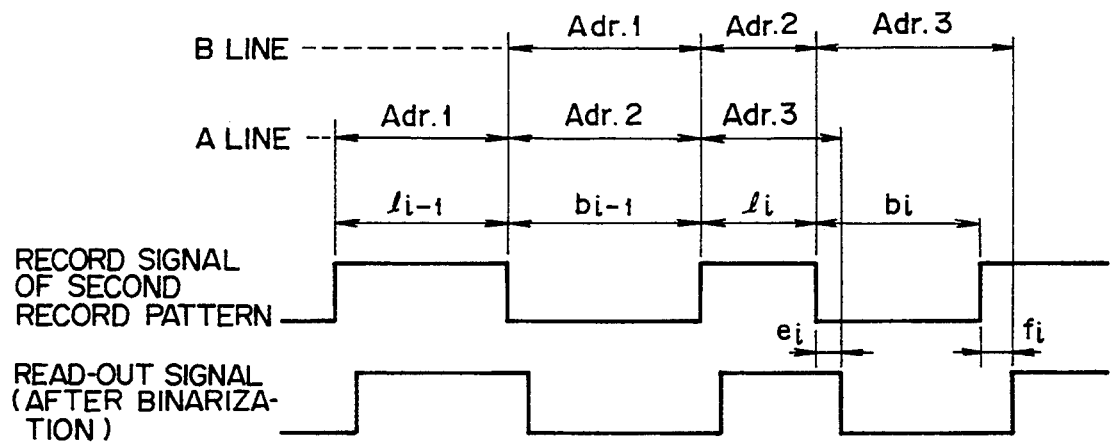
FIG. 10 is a graph showing relationships between a record signal and a read-out signal associated with patterns respectively including pulses of various lengths and gaps.

FIG. 9 shows an embodiment of the edge width adjusting table generator circuit 18, whereas FIG. 10 is a graph representing a record signal and a read-out binary signal related to a second record pattern including pulses of various lengths and gaps. The operation of the table generator circuit 18 will now be described by reference to FIGS. 9 and 10.

Let us assume here that the table is subdivided into three blocks to be indicated by addresses 1, 2, and 3, respectively. In this situation, ROMs 902 and 903 are loaded with digital data values of the pulse and gap lengths respectively associated with the addresses 1 and 2 of the A line shown in FIG. 10. In the configuration of FIG. 9, the addresses 1, 2, and 3 are denoted as AD1, AD2, and AD3, respectively. In the example of FIG. 10, letters $l_{i-1}$ and $b_{i-1}$ respectively designate addresses 1 and 2. An area indicated by the address 3 is supplied from an adder/subtractor circuit 909 with the length $l_i$ of the third pulse and data $l_i+e_i$ attained as the total of edge shift signals 832 related thereto. When $e_i$ is within the range of $l_i$, the difference therebetween is computed by the adder/subtractor 909 such that the address 3 is obtained as $l_i-e_i$. A ROM 904 is loaded with the third pulse length or gap length, which is a data item to be written in the edge shift adjusting table. Since $e_i$ represents a falling edge shift quantity, the data are stored in a falling edge shift adjusting table 19-1.

Figure 11A:
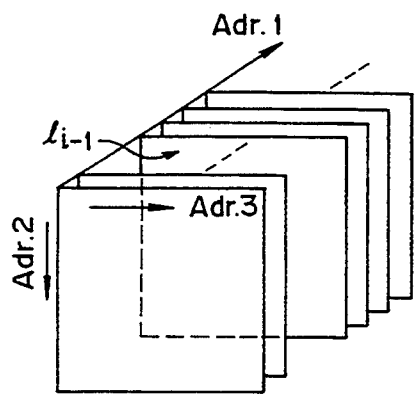
FIGS. 11A and 11B are diagrams illustratively showing a memory structure as a table.
Figure 11B:
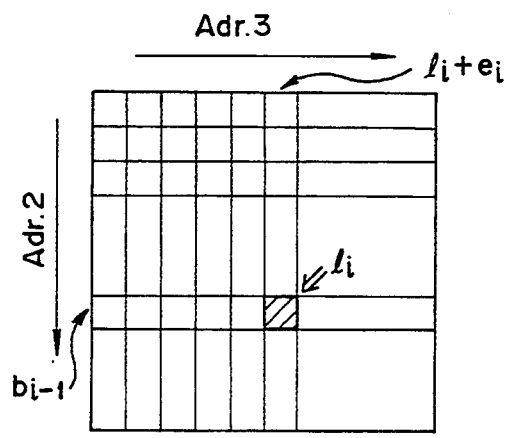

FIGS. 11A and 11B show relationships between the addresses 1 to 3 and the memory layout of the table with data loaded therein.

When the edge shift signal 832 denotes arising edge shift quantity $f_i$, the addresses 1 to 3 are respectively $b_{i-1}$, $l_i$, and $b_i+f_i$ of the B line shown in FIG. 10. Consequently, the data $b_i$ are written in a rising edge shift adjusting table 19-2. In order to appropriately treat the edge shift quantities related to combinations of various memory patterns, the respective addresses have a sufficiently high resolution in this constitution.

Each data item of these tables 19-1 and 19-2 is set to 0 in the initial stage such that a data item is stored therein for each input of the edge shift signal 832. However, for a pattern which cannot be recognized as a combination of second record patterns, the data item to be written is kept unchanged, namely 0. With respect to data for the address at which the data have not been written as above, they are obtained through an interpolation based on data already written in the table. As a result, also at the addresses 1 to 3 of FIG. 16B, which will be described later, data items can be written in the associated areas.

Gate circuits 906 to 908 and 910 are employed in a data write operation to achieve a write data changeover operation between a measured value and an interpolated value.

Figure 12:
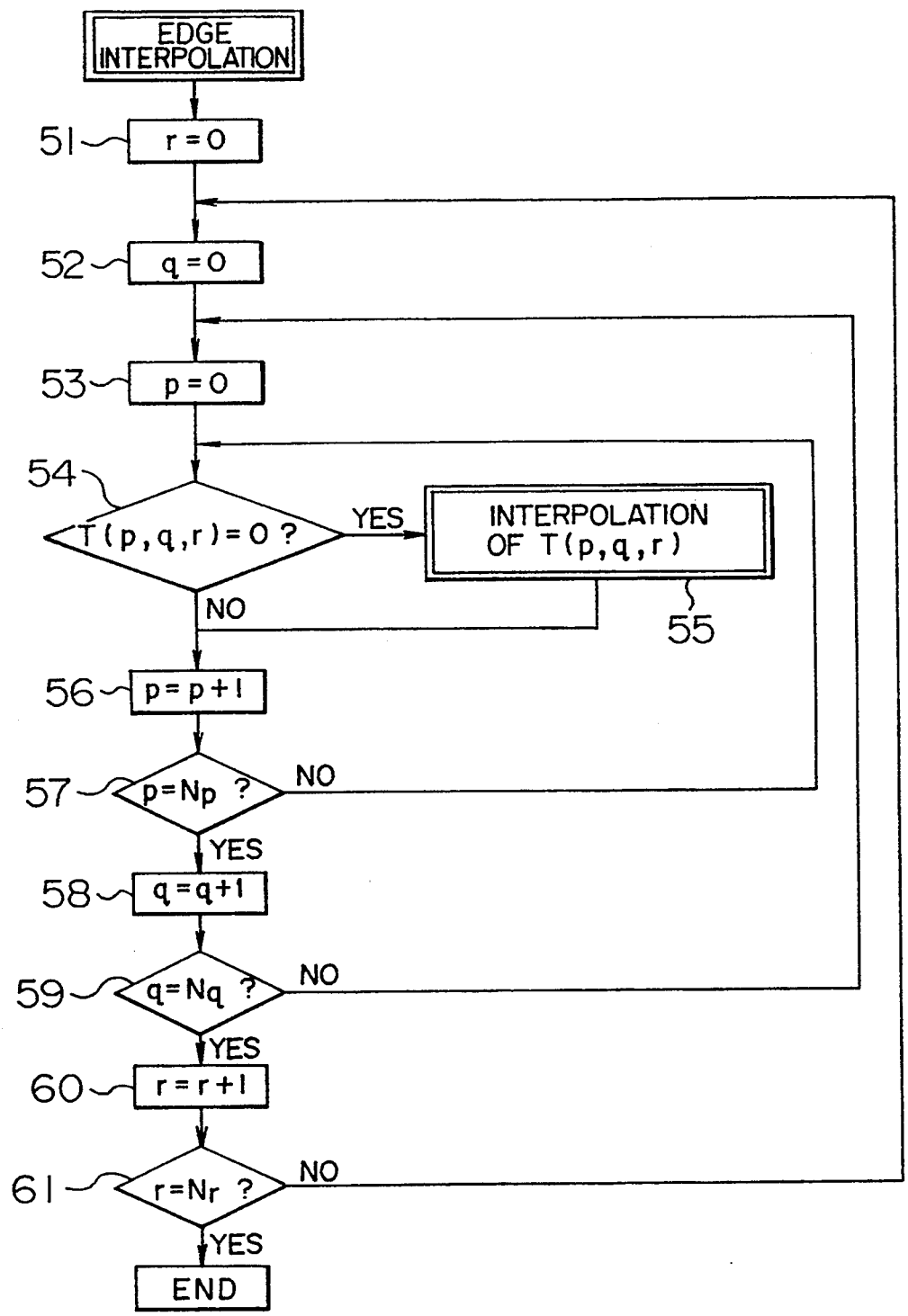
FIG. 12 is a flowchart showing an operation in which a data position necessitating an interpolation is determined.
Figure 13:
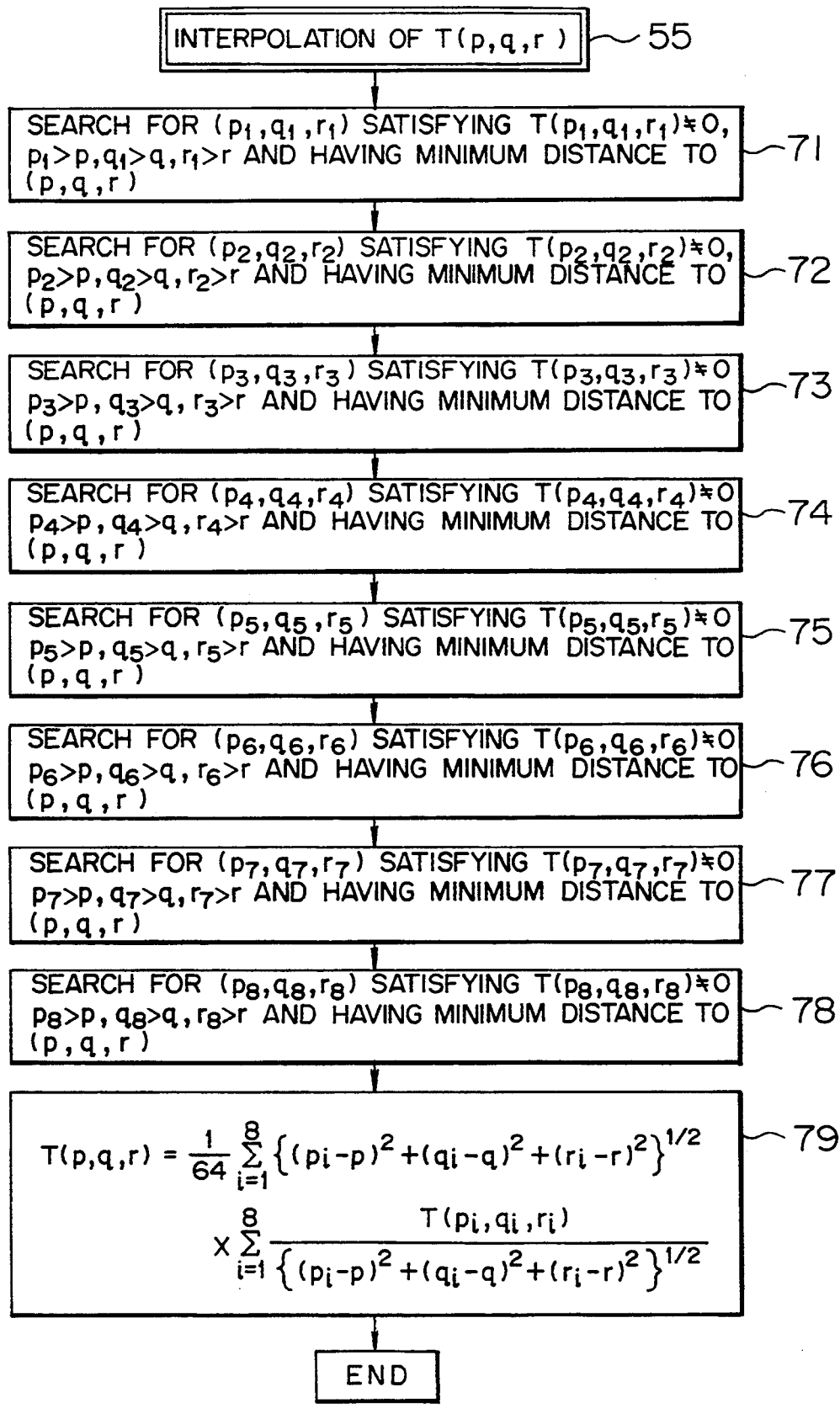
FIG. 13 is a flowchart showing the operation of the interpolation.

FIGS. 12 and 13 show flowcharts of the data interpolation. Namely, the system sequentially conducts a data scanning operation along the respective address directions. For data having a value 0, a data search is conducted in the three-dimensional memory space along the eight directions thereof to obtain measured data at a position next to a position 0 for each direction. Subsequently, each measured data item is assigned with a weight depending on a distance thereof from the position of the data having a value 0 so as to compute a mean value thereof. The obtained value is used as an interpolation value at the position of the data having the value 0.

Specifically, let us assume that the dimensions of the edge adjusting table T (AD1, AD2, AD3) are expressed as Np, Nq, and Nr in the respective directions AD1, AD2, and AD3; the pulse/gap lengths ($l_{i-1}$, $b_{i-1}$, $l_i$), respectively have resolutions $\Delta\alpha$, $\Delta\beta$, and $\Delta\gamma$; and the pulse/gap lengths ($l_{i-1}$, $b_{i-1}$, $l_i$) respectively take the minimum values $\alpha_0$, $\beta_0$, and $\gamma_0$. Under this condition, a combination of patterns ($l_{i-1}$, $b_{i-1}$, $l_i$) registered to the edge adjusting table is expressed as follows:

$$(l_{i-1}, b_{i-1}, l_i) = (\alpha_0 + p\Delta\alpha_0, \beta_0 + q\Delta\beta_0, \gamma_0 + r\Delta\gamma_0)$$

$$(0 \leq p \leq Np, 0 \leq q \leq Nq, 0 \leq r \leq Nr)$$

In consequence, when the table scanning operation is achieved, a set of data items (p, q, r) is inputted as an address value. In the flowchart of FIG. 12, steps 51, 52, and 53 initialize the respective addresses. A step 54 checks to determine whether or not data at an objective address position has a value 0. If this is the case, to obtain data for the area based on an interpolation, control is passed to a step 55. Otherwise, since the pertinent data have already been obtained as measured data, a data check is conducted in the next address position. Steps 56 and 57, 58 and 59, and 60 and 61 respectively check data in the directions of the addresses 1, 2, and 3.

FIG. 13 is a flowchart showing the operation of the interpolation.

A step 71 achieves a data search in the first direction of the eight directions to obtain measured data at a position next to the position (p, q, r) of data having a value 0.

A step 72 similarly conducts a data search in the second direction to obtain measured data at a position next to the position (p, q, r) of data having a value 0.

In steps 73 to 78, the data search operations are conducted in a similar manner to obtain measured data at the nearest positions in the respective directions as above.

A step 79 assigns the obtained data with weights reversely proportional to the respective distances relative to the position (p, q, r). Eight resultant measured data items are then processed to obtain a mean value, which is employed as interpolation data.

Figure 14:
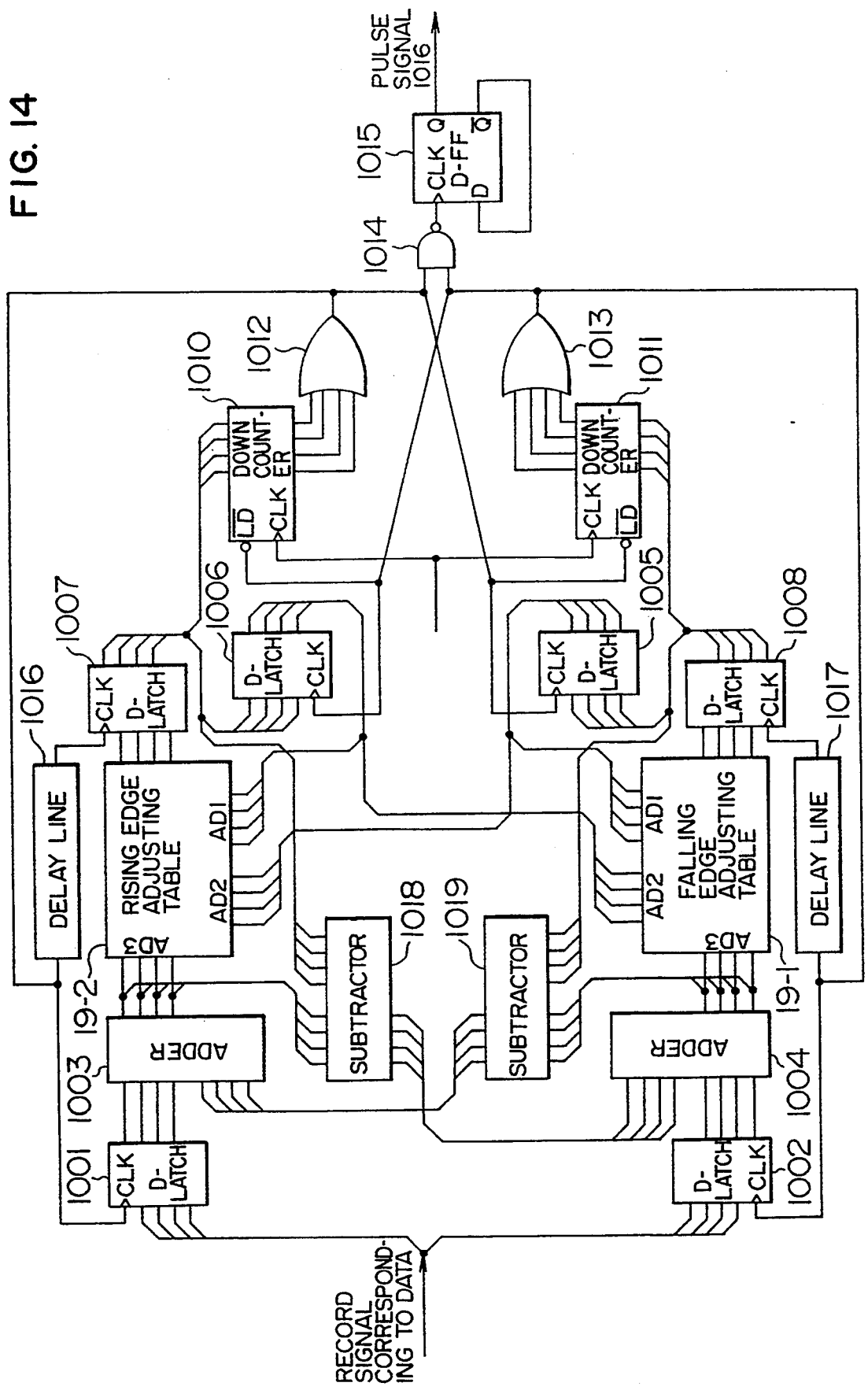
FIG. 14 is a diagram showing in detail an edge width adjusting circuit.
Figure 15:
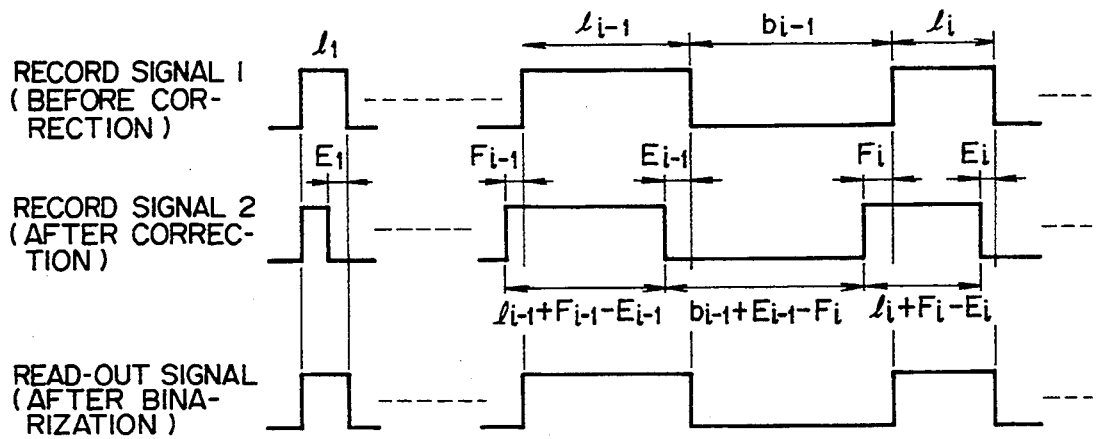
FIG. 15 is a graph showing an example of a correction in an actual data recording operation.

FIG. 14 shows an embodiment of the edge width adjusting circuit 21, whereas FIG. 15 shows an example of the correction in an actual data recording operation.

Figure 16A:
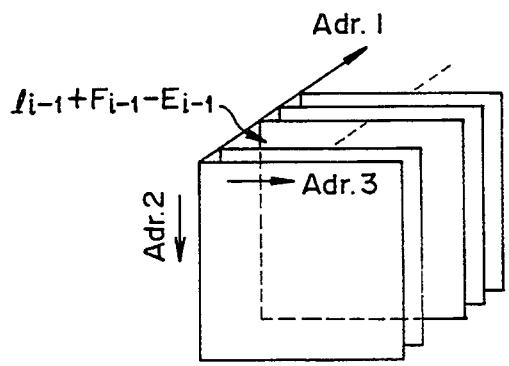
FIGS. 16A and 16B are diagrams showing an example of an operation in which correction data are obtained from the table.
Figure 16B:
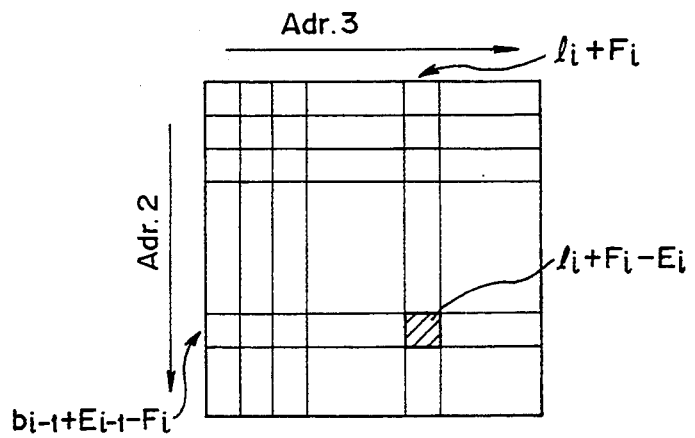

FIGS. 16A and 16B are diagrams useful to explain an operation example in which correction data are read from the table.

Referring now to FIGS. 15, 16A, and 16B, the operation of the edge width adjusting circuit 21 will be described.

In the constitution of FIG. 14, a latch circuit 1005 is used to set addresses 1 and 2 in association with the falling edge adjusting table 19-1 and the rising edge adjusting table 19-2, respectively. A latch circuit 1006 establishes addresses 2 and 1 for the edge adjusting tables 19-1 and 19-2, respectively. Each of adders 1003 and 1004 produces an output, which is used to set an address 3. Based on the value set as the address 3, a subtractor 1018 outputs a value equivalent to a rising edge shift quantity, whereas a subtractor 1018 similarly produces a value associated with a falling edge shift quantity. A latch circuit 1001 is disposed to store therein a value related to a gap length of a record pulse 1 shown in FIG. 15. A latch 1002 is employed to be loaded with a value equivalent to a pulse length of the record pulse 1. Down counters 1010 and 1011 and gate circuits 1012 and 1013 are used to convert a digital value into a pulse and a gap each having an associated length. The pulse and the gap undergoes the correction are outputted in the form of a pulse signal 1016.

When the first pulse $l_i$ of the record pulse 1 before correction is inputted, the system conducts processing as follows. Namely, since this is equivalent to a case where a pulse is recorded for the first time after a long interval of time, the pulse $l_1$ may be considered to have been received after a pulse of a small length followed by a gap having a great length. In this situation, the falling edge of the pulse is corrected by referencing the falling edge adjusting table 19-1.

First, the latches 1005 and 1006 are loaded with the minimum number of the address 1 and the maximum number of the address 2, respectively. Moreover, the output from the subtractor 1018 is set to 0. With this initialization, the latch 1002 and the adder 1004 each produce an identical output i.e. $l_1$. When a read operation is achieved on the table 19-1 in this state, since the value associated with Fi of the address 3 of FIG. 16B is beforehand set to 0 by the subtractor 1018, a pulse length $l_1-E_1$ is obtained as the corrected pulse length.

When the first gap is inputted after the first pulse of the record pulse 1, the rising edge adjusting table 19-2 is referenced to correct the rising edge of the gap. In this case, the latch 1006 to be loaded with the address 1 of the table 19-2 is set to the maximum number of the address 1, the latch 1005 to be loaded with the address 2 is set to $l_1-E_1$, and then the falling edge correction quantity $E_1$ of the previous pulse, which is a portion of a value to be used as the address 3, is set to the subtractor 1019. When a read operation is conducted on the table 19-2 under this condition, $b_1+E_1-F_1$ is obtained as the corrected gap length.

When the second pulse of the record pulse 1 is inputted, the falling edge adjusting table 19-1 is again referenced to accomplish the correction. Namely, the addresses 1, 2 and 3 are respectively set to the corrected pulse length $l_1-E_1$, the corrected gap length $b_1+E_1-F_1$, and $l_2+F_2$. Resultantly, the corrected pulse length is obtained as $l_2+F_2-E_2$.

FIG. 15 shows an example of the correction in a generalized form. Assuming for three patterns as collation units that the rising and falling edge correction quantities of the pulse and the gap are $F_{i-1}$, $E_{i-1}$, and $F_i$, respectively, to obtain the corrected length of the third pulse of the collation pattern, the addresses 1 and 2 are respectively set to the corrected pulse and gap lengths and the address 3 is set to the third record pulse length $l_i+F_i$ obtained by use of the preceding edge correction quantity as above. As a result, the corrected third pulse length is obtained as $l_i+F_i-E_i$.

The corrected gap length can also be obtained in a similar manner.

Figure 17:
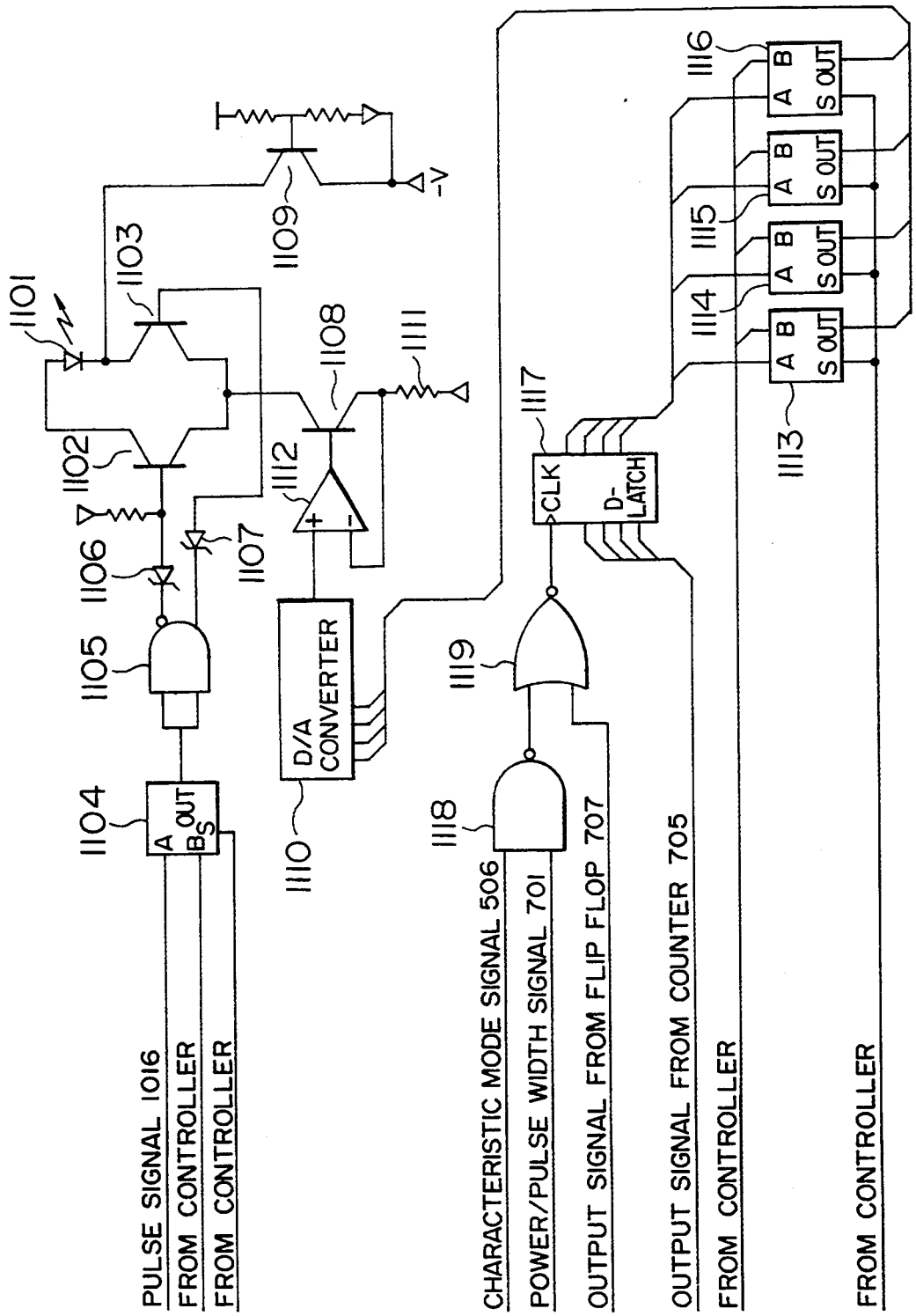
FIG. 17 is a detailed circuit diagram showing a laser driver circuit.

FIG. 17 shows an embodiment of the laser driver circuit 12.

This embodiment is implemented by additionally disposing a recording power change function to the conventional laser driver circuit. Each A input terminal of selector circuits 1113 to 1116 is supplied with a laser power preset value for an ordinary recording operation, whereas each B input terminal thereof is supplied with a laser power preset value to be used when the characteristic measuring test pattern of FIG. 7 is recorded in the recording power check mode.

For the laser power of an ordinary recording operation, a numeric value designating a level determined to be an optimal laser power in the recording power check mode is kept retained in a latch circuit 1117. In operation, the signal is continuously applied to the selectors 1113 to 1116.

An S terminal of each of the selectors 1113 to 1116 is supplied with a select signal from the controller such that the output therefrom is changed over as follows. Namely, in the recording power check mode, an Out terminal thereof outputs a signal received from the B terminal, whereas in the other modes, the Out terminal delivers a signal from the A terminal.

Each selector output is fed to a D/A converter 1110. Based on a level of an output signal produced by the D/A converter 1110, the laser power is decided for the recording operation.

In the description of the embodiment according to the present invention, the collation patterns have three edge widths; however, naturally, the correction can be similarly accomplished when collation patterns having other than three edges are employed.

According to the present invention, in the initial setup operation, while changing the laser power and the recording medium surface temperature, a plurality of particular patterns are recorded on the surface and are then read out therefrom to measure edge shift quantities respectively of the particular patterns based on the read-out signals. Depending on the results of the measurements, the edge shift quantity A related to the laser power variation and the edge shift quantity B associated with the variation in the recording medium surface temperature are obtained.

Before data are actually written on the surface, the particular patterns are again recorded thereon and are read out therefrom to again check for occurrence of an edge shift. If the edge shift is detected, the laser power variation quantity and the quantity of variation in the recording medium surface temperature are separately acquired depending on the edge shift quantities A and B obtained in advance.

If the variation quantity in the recording medium surface temperature is less than a predetermined value, the laser power is readjusted. If the quantity is more than the predetermined value, values in the edge width adjusting table are updated to correct the pit edge width of the actual data accordingly.

Figure 18:
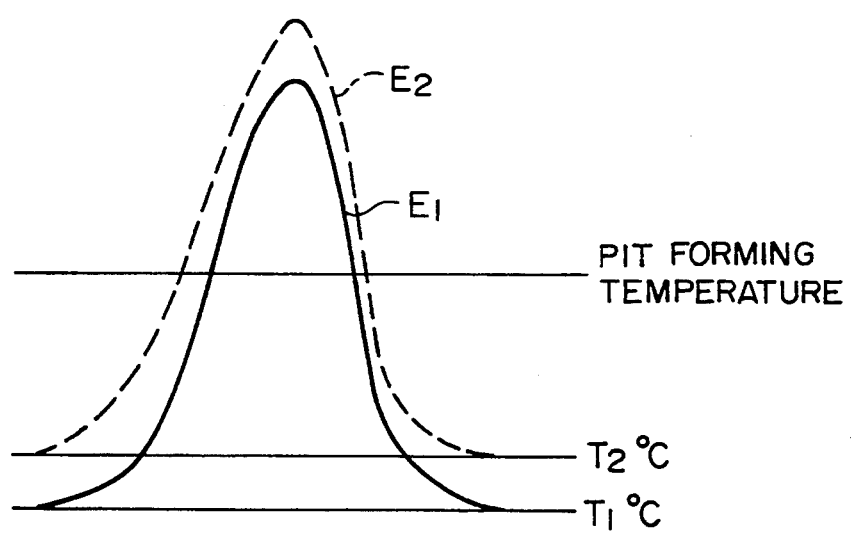
FIG. 18 is a diagram showing a relation between the recording medium surface temperature and the length of the pit.

Of the factors concerning the recording operation, the recording medium surface temperature and the laser power used for the recording operation may possibly be varied in a relatively short period of time. Since the recording principle of the optical disk is associated with heat, the variations in the factors above exert a considerably great influence on the recording condition. For example, as shown in FIG. 18, when the temperature on the recording medium surface is increased from $T_1°$ C. to $T_2°$ C. the energy distribution of the laser beam alters from $E_1$ to $E_2$.

Since the pit forming temperature is fixed, when the temperature on the recording medium surface is increased, the pit size becomes larger. Conversely, when the temperature is lowered, the pit size is reduced.

Moreover, when the laser power increases in a recording operation, the size of the record mark thus created becomes larger. The increase in the size is associated with the increase in the energy supplied to the recording medium surface. However, the state of the mark contour variation in the recording operation varies between the change in the temperature and the laser power variation. Consequently, for example, when the recording medium surface temperature changes to exceed a predetermined level, the variation cannot be completely canceled or compensated by adjusting the laser power, and hence an edge shift component may disadvantageously remain depending on record patterns in some cases.

In consequence, when a recording state is judged to have undergone a change, the factor associated with the laser power alteration and that related to the temperature variation on the recording medium surface are required to be separately detected. For this purpose, the record marks are written on the surface while altering the temperature on the surface and then the edge position variations appearing in the read-out signals of the record marks are measured for the respective conditions; moreover, the record marks are written on the surface while altering the recording laser power and then the edge position variations appearing in the read-out signals of the record marks are measured for the associated conditions.

The characteristics of these variations are independently sensed and measured so that the results obtained from the respective measurements are appropriately combined with each other for use in subsequent operations. That is, the factor of the edge position variation related to the temperature change on the recording medium surface depends only on the thermal characteristic of the recording medium, and the spot distribution (including, for example, a wavefront aberration) of the laser beam used in the recording operation does not influence the factor unless the beam spot is extremely expanded, for example. Consequently, it is only necessary to check the factor in advance as a characteristic unique to each recording medium so as to record the check result in a dedicated area. In addition, the temperature on the actual recording medium surface cannot be easily measured, and it is difficult to install the characteristic measuring function in an ordinary optical disk unit. Consequently, the edge shift quantities of the particular patterns are preferably measured and are recorded on the recording medium in the manufacturing process thereof. On the other hand, the factor associated with the laser power variation is influenced by the spot distribution of the laser beam used in the recording operation and hence may vary depending on the optical disk unit, and is required to be measured on the optical disk installed in the disk unit actually employed.

The edge variation characteristic related to the laser power variation is measured from the optical disk mounted on the disk unit utilized in the actual operation, whereas the edge variation characteristic associated with the variation in the recording medium surface temperature beforehand written on the medium is read therefrom. These characteristic data items are adopted as fundamental data items when the laser power variation component and the variation component of the recording medium surface temperature are separately detected.

Figure 19:
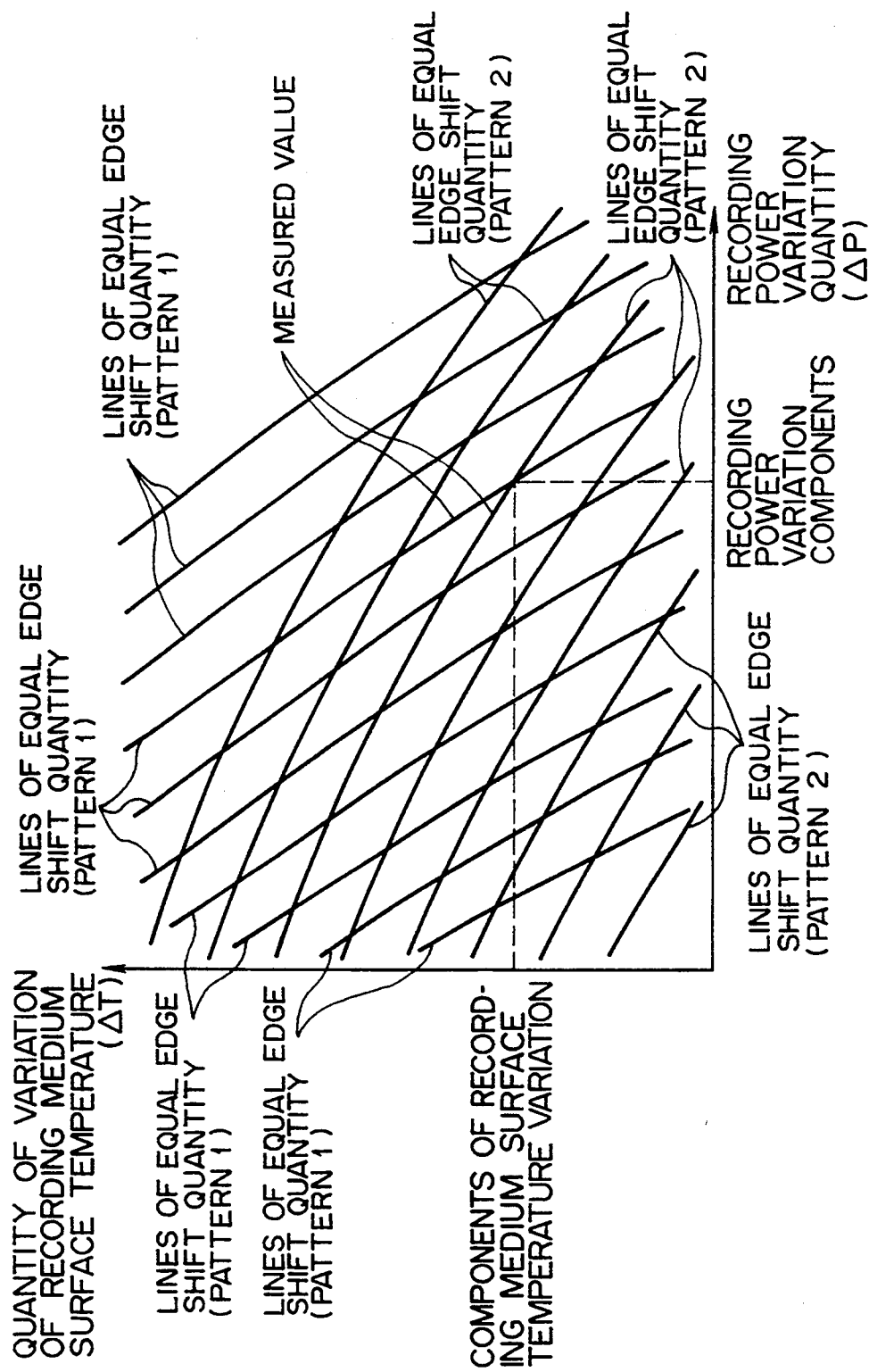
FIG. 19 is a graph showing relations between the variation of the laser power, variation of the recording medium surface temperature and the edge shift quantity.

FIG. 19 schematically shows relationships between the laser power variation component, the variation component of the recording medium surface temperature, and the edge shift variation quantity. In this graph, the abscissa and the ordinate respectively stand for the laser power variation component and the variation component of the recording medium surface temperature. The graph includes a group of curves with the read-out signal edge shift quantity set as a parameter, namely, curves of equal edge shift quantity are presented. In the group of curves, the interval along the abscissa and the contour of the curves are decided by the characteristics on the disk unit side such as the laser light intensity and the spot distribution, whereas the interval thereof along the ordinate is determined by the recording medium characteristics.

Consequently, if the laser power is kept unchanged, the edge shift characteristic related to the laser power variation need not be measured for each recording operation.

In the graph of FIG. 19, the contour of each of the edge shift curves slightly varies depending on the record patterns to be measured. Consequently, in principle, with the measured results obtained from two or more record patterns, the laser power variation quantity and the variation quantity of the recording medium surface temperature can be separately detected.

In other words, based on the edge shift quantity measured for each of the record patterns, there is determined a curve of equal edge shift quantity. Using intersections therebetween, the laser power variation quantity and the variation quantity of the recording medium surface temperature can be obtained.

Actually, in consideration of errors contained in the measurement results, at least three different patterns are favorably utilized to measure the edge shift quantities so that, depending on the results of the measurements, the laser power variation quantity and the variation quantity of the recording medium surface temperature are obtained, for example, by using a method of least squares.

According to the present invention, as the record patterns 1 and 2 of FIG. 19, there are selected two different patterns including three edge widths contained in patterns which are inevitably included when ordinary data are recorded in a sector of an optical disk, for example, a pattern used to generate a clock and a particular pattern adopted to check a shift of the clock at an intermediate point, thereby measuring the shift quantity for the last edge of each of the patterns. These patterns 1 and 2 are identical to the pattern 3 above.

According to the present invention, data representing the characteristic curves of FIG. 19 are acquired in the initial setup phase when power is turned on, namely, there are obtained edge shift quantities of the patterns 1 and 2 with respect to the unitary variation of the laser power and edge shift quantities of the patterns 1 and 2 with respect to the unitary variation of the recording medium surface temperature. Next, before recording actual data on the optical disk, the edge shift quantities of the patterns 1 and 2 are again measured so that the laser power variation quantity and the variation quantity of the recording medium surface temperature are obtained depending on the results of the measurements and the characteristic curves of FIG. 19.

Specifically, these variation quantities are obtained by solving the following simultaneous equations (1) and (2)

$$x1 \cdot \Delta P + y1 \cdot \Delta T = M1 \qquad (1)$$

$$x2 \cdot \Delta P + y2 \cdot \Delta T = M2 \qquad (2)$$

where:
- x1 is a variation quantity of the last edge of the pattern 1 with respect to the unitary variation quantity of the recording medium surface temperature;
- x2 is a variation quantity of the last edge of the pattern 2 with respect to the unitary variation quantity of the recording medium surface temperature;
- y1 indicates a variation quantity of the last edge of the pattern 1 with respect to the unitary variation quantity of the laser power;
- y2 indicates a variation quantity of the last edge of the pattern 2 with respect to the unitary variation quantity of the laser power;
- M1 stands for a variation quantity of the last edge of the pattern 1;
- M2 stands for a variation quantity of the last edge of the pattern 2;
- ΔP designates an objective variation quantity of the recording medium surface temperature; and
- Δt designates an objective variation quantity of the laser power.

The processing above is executed by means the CPU and the memory in the controller 22. Based on the magnitude of each of the variation quantities, the laser power is readjusted and/or the data in the table are updated to accomplish a correction for an edge interval optimal for the data to be recorded on the disk.

Subsequently, referring to the flowchart of FIG. 20, the overall operation will be described. First, when the optical disk unit is powered, the initial setup operation is achieved in the unit as follows.

The laser driver circuit 12 is first driven according to the first record pattern shown in FIG. 7 to record data on the optical disk 1. The data is then read out from the recorded position to obtain a read-out waveform, which is processed by the edge timing detector circuit 13 and the edge interval judge circuit 17 to search for the optical laser power. The value of the optical record power thus computed is set to the laser driver circuit 12 (step 81).

Next, the laser driver circuit 12 is driven according to the second record pattern to record the second pattern data on the optical disk 1. The data are then read out from the recorded position to obtain a read-out waveform, which is processed by the edge timing detector circuit 13, the edge interval judge circuit 17, and the edge width adjusting table generator circuit 18 to detect a shift quantity of the edge position for each of the third patterns contained in the read-out signal of the second pattern. Based on the obtained results, the edge width adjustment quantity table 19 is produced through the interpolation processing of FIGS. 12 and 13 (step 82).

Subsequently, the patterns inevitably appearing when ordinary data are recorded in a sector of the optical disk, for example a pattern used to create a clock and a particular pattern used to check a shift of the clock at an intermediate point, are recorded on the disk by setting a value of the laser power slightly shifted from the value for the optimal laser power to the laser driver circuit 12. Thereafter, the patterns are read out therefrom to acquire edge variation characteristic data of the patterns 1 and 2 with respect to the laser power variation. Next, the CPU in the controller 22 computes the edge shift quantities of the patterns 1 and 2 for the unitary variation quantity of the laser power. After the measurements are completely achieved, an optimal laser power is again set to the laser driver 12 (step 83).

Subsequently, the edge variation characteristic data which is associated with the recording medium surface temperature variation and which is recorded in a dedicated area of, for example, the inner-most track of the optical disk 1 is read therefrom, and then the CPU of the controller 22 computes the edge shift quantities of the patterns 1 and 2 with respect to the unitary variation quantity of the recording medium surface temperature (step 84).

The sequence of the steps 83 and 84 may be reversed.

The initial setup operation of the apparatus according to the present invention has been described. When the operation is finished, the system waits for an instruction from a device connected to the apparatus, for example, to the computer (step 85). On receiving a signal, a data read or write operation is accomplished depending on the received signal (step 86). The optical disk may possibly be replaced during the instruction reception wait time. Consequently, during this period of time, the system monitors an optical disk replacement such that when another disk is installed, the system conducts a processing similar to that achieved when the apparatus is powered (step 86).

When a write instruction is received, after the write operation (step 89) is finished, in order to decide whether or not the data are appropriately written on the disk, a read-after-write operation is accomplished to actually detect and to check the data. In this operation, based on the read-out signal of the stored data including the patterns 1 and 2 or the dedicated record pattern which includes the patterns 1 and 2 and which is prepared in a first field of the written data, edge shift quantities are detected by the edge timing detector circuit 13 and the edge interval judge circuit 17, thereby deciding whether or not an edge shift occurs depending on the detection result (step 90). The judgment is conducted on the basis of whether or not the detected edge shift quantity is within an allowable range associated therewith. When it is determined that the record state is kept unchanged, control is returned to the step 85, namely, the system enters the instruction reception wait mode.

When the edge shift quantity is judged to be beyond the allowable range, actual values are assigned to the simultaneous equations (1) and (2) to separately detect the laser power variation quantity $\Delta P$ and the variation quantity $\Delta T$ of the recording medium surface temperature (step 91). A check is then made to determine whether or not the variation quantity $\Delta T$ of the recording medium surface temperature is greater than a predetermined value (step 92). If the variation quantity $\Delta T$ of the recording medium surface temperature is small, it is only required to readjust the laser power to cope with the condition. Then, optimal laser power can be computed depending on the detected edge shift quantities and the edge shift characteristic associated with the laser power. The computed value is again set to the laser driver circuit 12 to rewrite the present data (step 93).

The readjustment of the laser power is equivalent to an operation in which the shift from the optimal laser power is corrected to replace the existing value with a value for the corrected optimal laser power.

If the variation quantity $\Delta T$ of the recording medium surface temperature is great, even when only the laser power is altered, the edge shift cannot be canceled or compensated. In this case, the second pattern is recorded on the disk and is then read therefrom to measure again the edge shift characteristic so as to update the data in the edge width adjusting table (step 94). Thereafter, while correcting the edge interval according to the correction method of FIGS. 15, 16A and 16B, the current data are rewritten again.

Description has been given of an embodiment according to the present invention.

With the provision of the pit edge interval correction method according to the present invention, it is possible to remove the variation of the edge position in the read-out waveform due to thermal interference caused for an identical record pulse because of a difference between the current and previous record patterns.

In the embodiment above, the recording line speed is fixed. However, since the rotation speed is fixed in many optical disks, the recording line speed and hence the recording characteristic vary depending on the recording radii. In a case of an optical disk, taking the random accessibility thereof into consideration, it is necessary in the recording characteristic measurement that characteristic measuring test patterns are recorded thereon at a plurality of positions respectively having different recording line speeds on the disk surface to detect the edge shift characteristic. For this purpose, a plurality of edge width adjusting tables 19 are prepared in the system.

The measurements are conducted on a plurality of disk surface areas such as areas on an inner circumferential side, on an outer circumferential side, and in an intermediate portion thereof. These areas may be particularly allocated on the disk or ordinary data recording areas may be used for this purpose. In the latter case, if such an area allocated for the measurement already contains record data, the system uses another free area or the system temporarily moves information from the area to another area such as a memory in the controller before using the allocated area.

The patterns 1 and 2 of FIG. 19 are not limited to those having the three edge intervals, namely, the length thereof may be arbitrarily established.

While particular embodiments of the invention have been shown and described, it will be obvious to those skilled in the art that various changes and modifications may be made without departing from the present invention in its broader aspects.

We claim:

1. A method of correcting a pit edge interval in an optical recording/read-out apparatus comprising the steps of:

(a1) setting a first laser power, and recording N times a sequential record pattern B of record signals including a plurality of patterns An (n=1, 2, ..., N) each having an edge width, said patterns An respectively being recorded having various combinations of said edge widths, where N is an integer;

(a2) reading out said pattern B as a recorded signal;

(b1) classifying the read-out signal B into one of said patterns An and obtaining, for each edge position of each of said patterns An, an edge shift quantity associated with said edge position relative to an edge position indicating an ideal edge recording position thereof;

(b2) generating and storing a table containing relationships between said patterns An and said edge shift quantities;

(c) setting said laser power to a plurality of different values, recording a plurality of mutually different patterns Cn (n=1, 2, ..., M) by each said laser power thus set, and reading out said patterns Cn;

(d) obtaining, based on a read-out signal of each said pattern Cn, an edge shift quantity with respect to a variation rate of said laser power;

(e) setting said laser power to said first laser power;

(f) attaining, for each said pattern Cn, an edge shift quantity with respect to a variation rate of a disk recording medium surface temperature of an optical disk;

(g) recording said pattern Cn before recording actual data, reading out said patterns Cn, and checking to determine whether or not an edge shift beyond an allowable range occurs;

(h) separately detecting, when said check indicates an occurrence of an edge shift beyond an allowable range, a variation of said laser power and a variation of said recording medium surface temperature based on a quantity of said edge shift occurred, said edge shift quantity with respect to the variation rate of said laser power, and said edge shift quantity with respect to the variation rate of said disk recording medium surface temperature;

(i) updating, based on each said variation, the setting value of said laser power and data of said table; and (j) referencing, when recording actual data, said table and for correcting the edge interval of the actual data.

2. An edge interval connecting method according to claim 1 wherein said step (a1) includes the step of:

recording a predetermined pattern D in accordance with a second plurality of different laser power values and reading out said pattern D;

wherein said first laser power value is associated with a read-out signal of said pattern D having an edge shift quantity within an allowable range.

3. An edge interval correcting method according to claim 1 wherein said step (b2) further includes the steps of:

registering to said table a pattern E which is not classified as said pattern An; and obtaining an edge shift quantity related to said pattern E through an interpolation based on the edge shift quantities of said patterns An.

4. An edge interval correcting method according to claim 1 wherein said step of obtaining an edge shift quantity with respect to a variation rate of said recording medium surface temperature includes the steps of:

setting said recording medium surface temperature to a plurality of different values, recording said patterns Cn by a predetermined laser power, and reading out said patterns Cn; and obtaining the edge shift quantity with respect to a variation rate of said recording medium surface temperature based on an edge shift quantity of each said pattern Cn in the read-out signal and the variation of said recording medium surface temperature.

5. An edge interval correcting method according to claim 4 wherein said step of obtaining an edge shift quantity with respect to a variation rate quantity of said recording medium surface temperature includes the steps of:

obtaining the edge shift quantity by reading data from an optical disk, the data being beforehand loaded therein and representing relationships, for said patterns Cn, between the variation rate of said recording medium surface temperature and edge shift quantity.

6. A method of correcting a pit edge interval in an optical recording/read-out apparatus comprising the steps of:

(a) recording a plurality of mutually different patterns Cn (n=1, 2, ..., M) with a predetermined laser power while changing a recording medium surface temperature;

(b) recording, in a predetermined area of the optical disk, relationships between edge shift quantities of said patterns and variations of said recording medium surface temperature;

(c) reading said relationships from said optical disk and storing said relationships in a memory;

(d) recording said patterns Cn with a plurality of laser power, reading out said patterns Cn, and attaining, based on a read-out signal, relationships between the edge shift quantities of said patterns Cn and variations of said laser power;

(e) recording, before writing actual data, said patterns Cn again, reading out said patterns Cn, and checking a read-out signal to determine whether or not an edge shift occurs therein;

(f) obtaining, when said check indicates an occurrence of an edge shift beyond an allowable range, the variation of said recording medium surface temperature and the variation of said laser power based on said edge shift quantity occurred, relationships between the variations of said recording medium surface temperature and the edge shift quantities of said patterns Cn, and relationships between the variations of said laser power and the edge shift quantities of said patterns Cn; and setting, based on each said variation, said laser power and a correction quantity of the pit edge interval to optimal values, respectively.

7. An edge interval correcting method according to claim 6 wherein said step of setting a correction quantity to an optimal value includes the steps of:

forming a table representing relationships between a plurality of patterns An (n=1, 2, ..., N) each having shift quantities of last edges of said patterns An in a read-out signal, where N is an integer;

collating, when recording actual data, a pattern of said actual data and the patterns registered to said table; and correcting, when said collation results in a matching, the edge position of the collated pattern of said actual data based on the shift quantities registered to said table, thereby canceling a thermal interference from a previously-recorded pattern.

8. An edge interval correcting method according to claim 6 wherein said step of forming a table further includes the steps of:

registering to said table a pattern E which is different from said patterns An; and obtaining a shift quantity of a last edge of said pattern E through an interpolation based on the shift quantities of last edges of said patterns An.

9. An apparatus for correcting a pit edge interval in an optical recording/read-out apparatus comprising:

(1) recording control means for recording a signal on an optical disk with a laser power set for the recording;

(2) first control means for recording a predetermined pattern B including a plurality of different patterns An (n=1, 2, ..., N) each having a predetermined number of rising edges and a predetermined number of falling edges and reading out said pattern B;

(3) storing means for memorizing therein, based on a read-out signal of said pattern B, relationships between said patterns An and edge shift quantities thereof in a form of a table;

(4) second control means for recording a plurality of mutually different patterns Cn (n=1, 2, ..., M) with laser power set to a plurality of different values and reading out said patterns Cn;

(5) means for obtaining, based on a read-out signal of each said pattern Cn, an edge shift quantity with respect to a variation rate of said laser power;

(6) means for attaining, for each said pattern Cn, an edge shift quantity with respect to a variation rate of a disk recording medium surface temperature (an ambient temperature) of an optical disk;

(7) means for recording said patterns Cn before recording actual data, reading out said patterns Cn and checking to determine whether or not an edge shift beyond an allowable range occurs;

(8) means for separately detecting, when said check indicates an occurrence of an edge shift beyond an allowable range, a variation of said laser power and a variation of said recording medium surface temperature based on a quantity of said edge shift occurred, said edge shift quantity with respect to the variation rate of said laser power, and said edge shift quantity with respect to the variation rate of said disk recording medium surface temperature;

(9) third means for updating, based on each said variation, the setting value of said laser power and data of said table; and

(10) means for referencing, when recording actual data, said table and for correcting the edge interval of the actual data.

10. An edge interval correcting apparatus according to claim 9 wherein said recording control means includes determining means for determining a laser power for the recording, said determining means including:

fourth control means for recording a predetermined pattern D in accordance with a plurality of different laser power values and reading out said pattern D; and means for setting, as the laser power for recording the pattern B, a laser power which is associated with a read-out signal of said pattern D having an edge shift quantity within an allowable range.

11. An edge interval correcting apparatus according to claim 9 wherein said storing means further includes:

means for registering to said table a pattern E which is not classified as said pattern An; and means for obtaining an edge shift quantity related to said pattern E through an interpolation based on the edge shift quantities of said patterns An.

12. An edge interval correcting apparatus according to claim 9 wherein said means for obtaining an edge shift quantity with respect to a variation rate of said recording medium surface temperature includes:

fifth means for setting said recording medium surface temperature to a plurality of different values, recording said patterns Cn by a predetermined laser power, and reading out said patterns Cn; and means for obtaining the edge shift quantity with respect to a variation rate of said recording medium surface temperature based on an edge shift quantity of each said pattern Cn in the read-out signal and the variation of said recording medium surface temperature.

13. An edge interval correcting apparatus according to claim 12 wherein the edge shift quantity with respect to the variation rate of said recording medium surface temperature is obtained by reading data from an optical disk, the data being beforehand loaded therein and representing relationships, for said patterns Cn, between the variation rate of said recording medium surface temperature and edge shift quantity.

14. An edge interval correcting method according to claim 3, wherein said patterns An have the same number of rising edges and the same number of falling edges as said pattern E.

15. An edge interval correcting method according to claim 8, wherein said patterns An have the same number of rising edges and the same number of falling edges as said pattern E.

16. An edge interval correcting method according to claim 11, wherein said patterns An have the same number of rising edges and the same number of falling edges as said pattern E.

* * * * *